United States Patent
Wanger et al.

[11] Patent Number: 5,428,587
[45] Date of Patent: Jun. 27, 1995

[54] INPUT/OUTPUT COMMUNICATION BETWEEN AUTOCHANGER AND DRIVE

[75] Inventors: Mark E. Wanger; Mark J. Bianchi, both of Fort Collins; Kraig A. Proehl, Loveland, all of Colo.

[73] Assignee: Hewlett-Packard Company, Palo Alto, Calif.

[21] Appl. No.: 252,146

[22] Filed: Jun. 1, 1994

Related U.S. Application Data

[63] Continuation of Ser. No. 422,313, Oct. 16, 1989, abandoned.

[51] Int. Cl.6 .................. G11B 19/06; G11B 19/08
[52] U.S. Cl. ........................ 369/30; 369/19; 369/34
[58] Field of Search ............... 369/32, 33, 34, 35, 369/36, 38, 39, 19, 20, 21, 22, 23, 24, 92; 360/92; 455/603; 340/870.16, 825.17, 825.18

[56] References Cited

U.S. PATENT DOCUMENTS

| | | | |
|---|---|---|---|
| 3,582,949 | 6/1971 | Forst | 360/12 |
| 3,872,505 | 3/1975 | Hino et al. | 360/92 |
| 4,218,115 | 8/1980 | Parker | 369/2 |
| 4,570,188 | 2/1986 | Ichiyanagi | 360/35.1 |
| 4,789,973 | 12/1988 | Mabuchi | 360/137 X |
| 4,812,922 | 3/1989 | Minoura et al. | 360/10.1 |

*Primary Examiner*—Stuart S. Levy
*Assistant Examiner*—Paul J. Ditmyer

[57] ABSTRACT

Disclosed is an optical disk handling system, called an autochanger, having two control systems to provide the six motions necessary to move optical disk cartridges from storage holding cells to an optical drive. The system uses shaft encoders on two motors of the two control systems, and current or voltage feedback from the motors, for all positioning, and for detecting the location of the mechanisms during, and at the end of, moves. An optical drive interface connects the electronics of the autochanger and the optical drive, and includes electrical signals to emulate an eject pushbutton on the optical drive and an indicator lamp on the optical drive. The autochanger monitors the on and off state of the lamp signal as well as the duration of the on and off cycles to determine which operation is being performed by the optical drive. The autochanger uses the lamp signal and the eject signal to control all operations with the optical drive.

6 Claims, 19 Drawing Sheets

INPUT/OUTPUT COMMUNICATION BETWEEN AUTOCHANGER AND DRIVE

CROSS REFERENCE TO RELATED APPLICATIONS

This is a continuation of application Ser. No 07/422,313 filed on Oct. 16, 1989, now abandoned.

BACKGROUND OF THE INVENTION

This invention relates to computer systems and more particularly to an apparatus for handling and storing optical disk cartridges. Even more particularly this invention relates to the interface between the control system of such apparatus and the optical drive used for reading and writing data.

An optical disk is a data storage medium which is readable by a laser-based reading device. Optical disks known as "compact disks" or "CDs" have become increasingly popular during the past few years for recording music and audio-visual works. Due to the huge storage capacity of optical disks as compared to conventional magnetic storage media, optical disks known as "ROM disks" have become popular for storing computer readable information. Recent technology has produced optical disks which can be written as well as read by the computer, thus, in the future optical disks are expected to become increasingly more important in the computer industry and may eventually replace magnetically readable and writable storage media such as "floppy disks" and "hard disks."

Optical disks of the type used in computer applications are generally mounted in cartridges, and the reading devices generally read or write data through a slot provided on a surface of the cartridge. Currently, most optical disks are hand-inserted into disk readers. However, for large databases consisting of many optical disks, it is preferable, and perhaps essential, to provide an optical disk storage system for storing the disks at known locations, and an optical disk handling system which is capable of retrieving a desired disk from a storage location and inserting the disk into an optical disk reader. In a disk storage system wherein the stored disks and an associated disk reader are arranged in a longitudinally extending, two-dimensional array consisting of vertically extending columns and laterally extending rows, it is necessary for a disk handling system to be capable of engaging a disk, moving it vertically, laterally, and longitudinally and then releasing it in order to remove it from storage, move it into aligned relationship with the disk reader, and insert it into the disk reader.

Currently, optical disk readers suitable for use in an optical disk handling system are designed for manual insertion of disks. These optical disk readers have human oriented features, such as pushbuttons for initiating operations and lights that indicate the status of the optical drive. For an optical disk handling system to be economical, it will have to operate with the current, human oriented, optical drives, and thus must mimic human operator features.

There is need in the art then for an optical disk handling system that will interact with an optical disk drive in the same manner as a human operator. There is a further need for such a system that performs such operations using inputs and outputs that function in a manner suitable for a human operator. A still further need is for such a system that inserts and removes cartridges in a manner that mimics the operations that would be done by a human operator.

Various features and components of such a cartridge handling system are disclosed in U.S. patent applications:

(A) Ser. No. 278,102 filed Nov. 30, 1988, now U.S. Pat. No. 4,998,232 for OPTICAL DISK HANDLING APPARATUS WITH FLIP LATCH of Methlie, Oliver, Stavely and Wanger;

(B) Ser. No. 288,608 filed Dec. 22, 1988, now U.S. Pat. No. 5,062,093 for OPTICAL DISK INSERTION APPARATUS of Christie, Wanger, Dauner, Jones and Domel;

(C) Ser. No. 298,388 filed Jan. 18, 1989, now U.S. Pat. No. 5,101,387 for LATERAL DISPLACEMENT CONTROL ASSEMBLY FOR AN OPTICAL DISK HANDLING SYSTEM of Wanger, Methlie, Stavely and Oliver; and (D) Ser. No. 305,898 filed Feb. 2, 1989, now U.S. Pat. No. 5,014,255 for OPTICAL DISK CARTRIDGE HANDLING APPARATUS WITH PASSIVE CARTRIDGE ENGAGEMENT ASSEMBLY of Wanger, Methlie, Jones and Stavely;

(E) Ser. No. 326,572 filed Feb. 28, 1989, now U.S. Pat. No. 5,043,962 for CARTRIDGE HANDLING SYSTEM of Wanger, Methlie, Christie, Dauner, Jones, Oliver, and Stavely, (F) Ser. No. 326,146 filed Mar. 19, 1989, now U.S. Pat. No. 5,040,159 for MECHANICAL SENSE OF TOUCH IN A CONTROL SYSTEM of Oliver, Wanger, Stavely, Methlie, Bianchi, Kato, and Proehl, which are each hereby specifically incorporated by reference for all that is disclosed therein.

SUMMARY OF THE INVENTION

It is an object of the present invention to allow an autochanger to interact with an optical drive in the same manner that a human operator would interact with such a drive.

It is another object of the invention to detect the function being performed by the optical drive by monitoring a signal representative of a visual light indicator provided by the optical drive.

Yet another object of the invention is to monitor the duration of the light signal on and off times to determine the function being performed by the optical drive.

Another object is to monitor the sequence of the on and off times of the light signal in order to determine the function being performed by the optical drive.

Another object of the invention is to calculate the forces being exerted by the control system.

Another object is to detect obstructions in the system by monitoring the forces being exerted by the system.

Yet another object is to detect completion of an operation of the control system by monitoring the force being exerted.

Another object of the invention is to adjust the movements of the motors of the control system until a desired force or opposition is obtained.

A further object of the invention is to insert a cartridge into the optical drive while monitoring the force being exerted on the cartridge in order to determine the next operation to perform on the cartridge.

A still further object is to move a cartridge engaging assembly up and down in a short cycle to seat the cartridge during removal of the cartridge from the drive.

The above and other objects are accomplished in an optical disk handling system, called an autochanger, having two control systems to provide the six motions necessary to move optical disk cartridges from a storage holding unit array, or cells, to an optical disk reading device, or optical drive. The optical drive, located in the array of cells, reads or writes data on an optical disk in the cartridge. After the reading or writing operation, the cartridge is replaced in its original cell. The system uses shaft encoders on two motors of the two control systems, and current or voltage feedback from the motors, for all positioning and for detecting the location of the mechanisms during, and at the end of, moves. The shaft encoders are used to position a mechanism close to the eventual move location, then motor current or voltage feedback is used to determine the opposition to the movement of the mechanism. This opposition, depending on the particular target location, tells the control system whether the mechanism has reached its destination. The amount of opposition is tested to certain limits such that too little opposition means the movement is not complete whereas too much opposition means an obstacle has been encountered.

The cells are organized into two columns. The control systems use a lateral displacement assembly to move a cartridge from a cell in one column to a cell in the other column, or to move a cartridge between the optical drive, which is located in one of the columns, to a cell in the other column.

The control systems use a cartridge engaging assembly to attach to an exposed end portion of a cartridge positioned in a cell or the optical drive. A longitudinal displacement assembly is used by the control systems to move the cartridge, after attachment, out of the cell or optical drive. After positioning the cartridge vertically and laterally, the longitudinal displacement assembly is then used to move the cartridge into a cell or the optical drive, where the engaging assembly releases the cartridge. Together the cartridge engaging assembly and the longitudinal displacement assembly form an assembly called the transport.

An interface between the optical drive and the electronics of the autochanger provide an electrical signal equivalent of a front panel lamp on the optical drive, as well as an electrical signal equivalent of an eject pushbutton. Insertion of the cartridge into the optical drive and removal of a cartridge from the optical drive are controlled with the use of these two signals.

The autochanger interacts with the drive by slowly inserting a cartridge into the drive while monitoring the lamp signal to detect when the cartridge has been accepted by the optical drive. The autochanger then releases the cartridge so the optical drive can load the cartridge. The autochanger activates the eject signal, then monitors the lamp signal to determine when the optical drive has ejected the cartridge. When the cartridge is available, the autochanger engages the cartridge, "wiggles" the engaging assemble up and down to ensure proper seating, and then removes the cartridge.

BRIEF DESCRIPTION OF THE DRAWINGS

The above and other objects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

The optical disk handling system ("autochanger") of the present invention uses two control systems to provide the six motions necessary to move optical disk cartridges from a storage holding unit array ("cells") to an optical disk reading device ("optical drive"). The optical drive, also located in the array, reads or writes data on an optical disk in the cartridge. After the reading or writing operation, the cartridge is replaced in its original cell. A human operator can enter a cartridge into the system through a cartridge insertion assembly ("mailslot"). Each time an operator enters a cartridge into the mailslot, the control systems move the cartridge either to a cell or the optical drive as requested by the host computer system connected to the autochanger. Cartridges can also be moved from the optical drive or cells to the mailslot for removal by the operator.

Data can be located on either side of the optical disk within a cartridge. The control systems use a flip assembly in the autochanger to turn the cartridge over, allowing either side of the disk to be arranged for reading or writing by the optical drive.

The cells are organized into two columns. The control systems use a lateral displacement assembly to move a cartridge from a cell in one column to a cell in the other column, or to move a cartridge between the optical drive, which is located in one of the columns, to a cell in the other column. Also, the mailslot is located in one of the columns, so the control systems use the lateral displacement assembly to move a cartridge from the mailslot to the other column.

The control systems use a cartridge engaging assembly to attach to an exposed end portion of a cartridge positioned in a cell or the optical drive. A longitudinal displacement assembly is used by the control systems to move the cartridge, after attachment, out of the cell or optical drive. After positioning the cartridge vertically and laterally, the longitudinal displacement assembly is then used to move the cartridge into a cell or the optical drive, where the engaging assembly releases the cartridge. Together the cartridge engaging assembly, the longitudinal displacement assembly, and the lateral displacement assembly form an assembly called the transport.

A more complete description of the mechanical aspects of the autochanger may be had by referencing the aforementioned patent applications (E) and (F).

Figure 1:
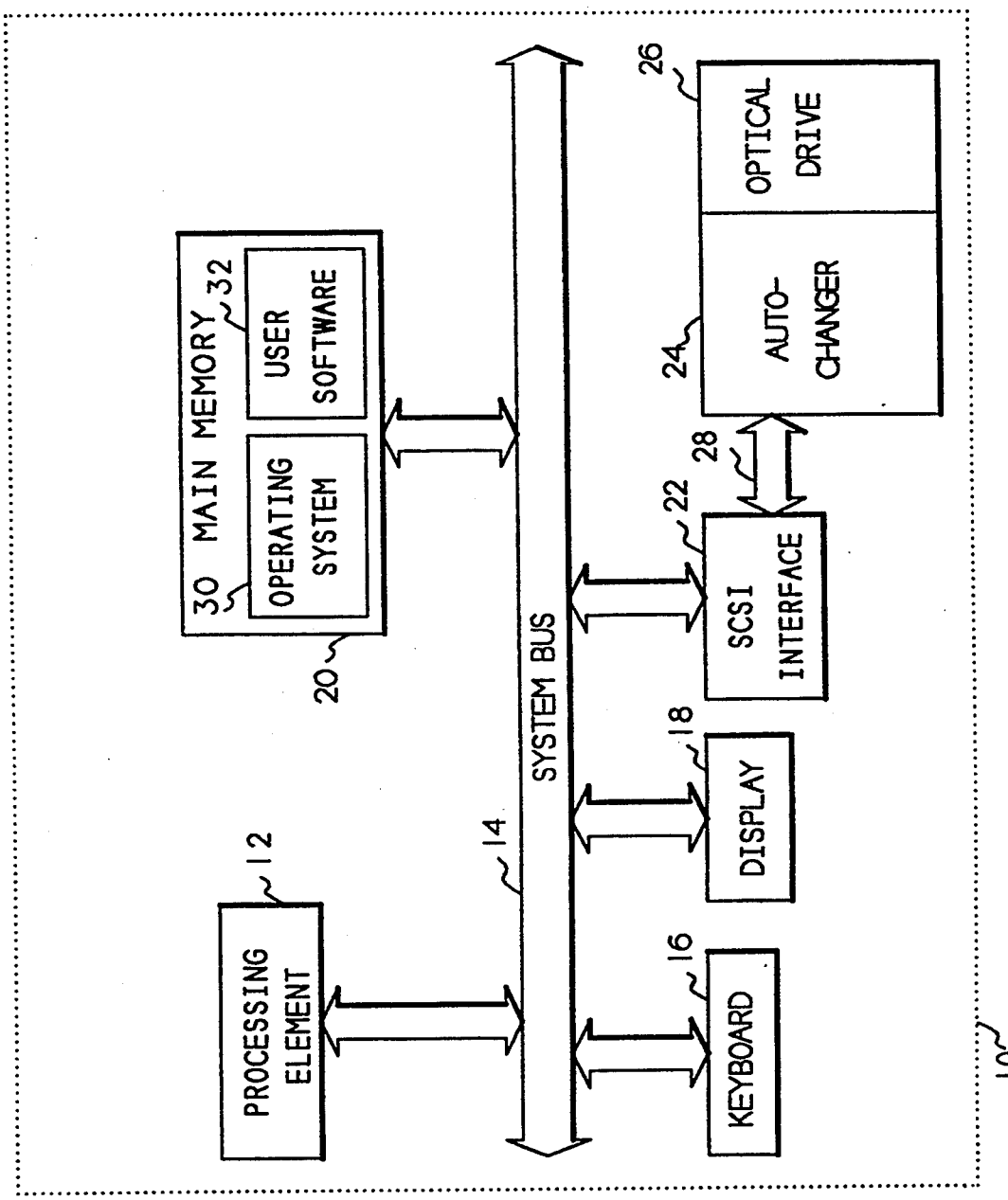
FIG. 1 shows a block diagram of a computer system incorporating the present invention.

Referring now to FIG. 1, a block diagram of the environment of the present invention is shown. A computer system 10 has a processing element 12 connected to a system bus 14. The processing element 12 receives instructions from a main memory 20 via the system bus 14 and communicates with a human operator using a keyboard 16 for input and a display 18 for output. An interface 22, which is a Small Computer System Interface (SCSI), connects the autochanger 24, via a bus 28, with the computer system 10. The autochanger 24 contains an array of cells for holding a plurality of optical disk cartridges. Each cartridge contains an optical disk which is used for data storage. Incorporated within the autochanger 24 is an optical drive 26, used for reading and writing data on the optical disks within the cartridges. The optical drive 26 is also attached to the system bus 14 through the SCSI interface 22 for transferring data between the drive 26 and the main memory 20 under control of the processing element 12.

The main memory 20 holds the programming instructions of the computer system 10, including an operating system 30 and user software 32. The operating system 30 and the user software 32 combine to control the selection of cartridges within the autochanger 24, and the reading and writing of data by the optical drive 26.

Figure 2:
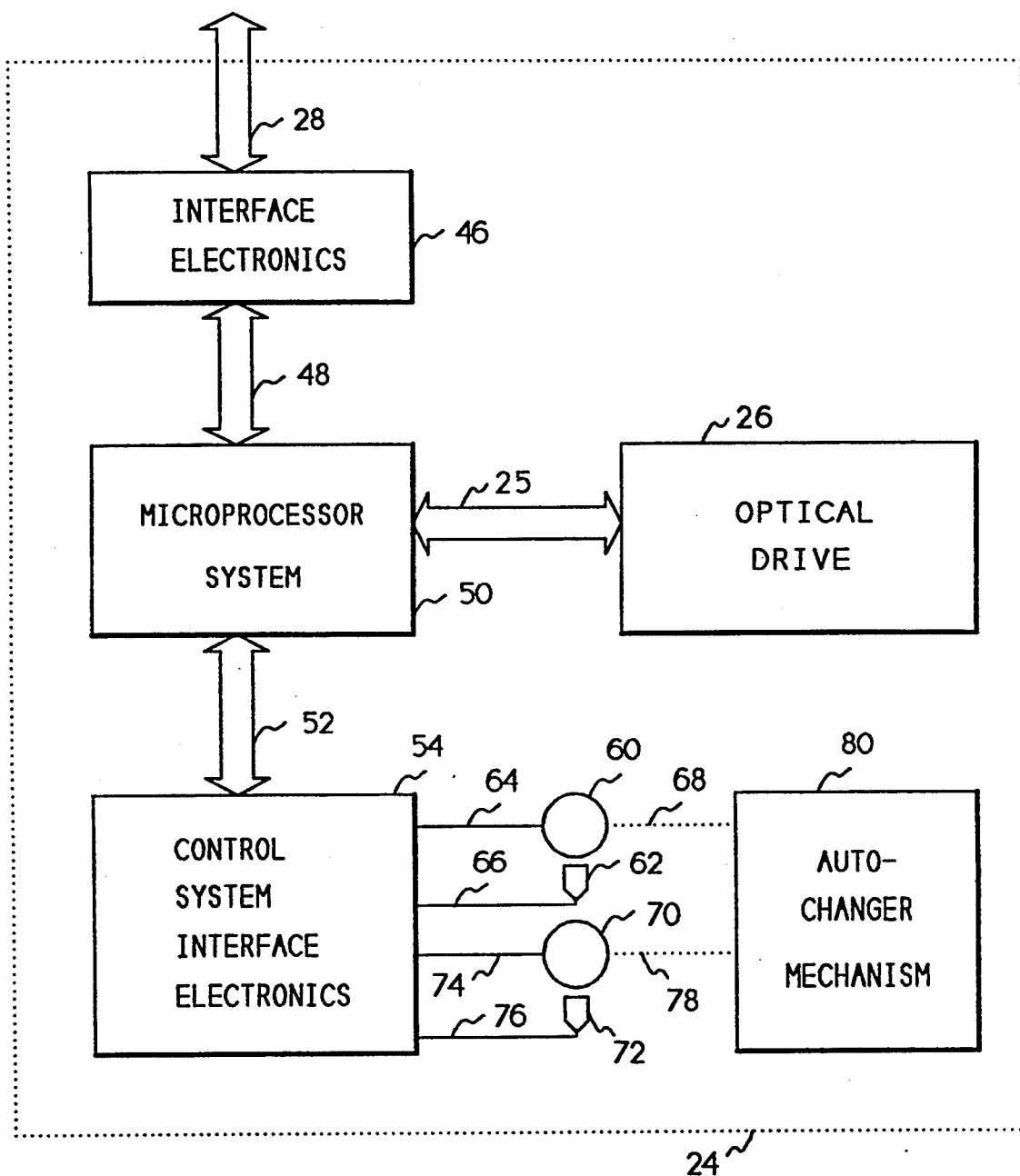
FIG. 2 shows a high level block diagram of the electronics of the present invention.

FIG. 2 shows a high level block diagram of the autochanger 24. An interface bus 28 connects the interface 22 (FIG. 1) to the autochanger interface electronics 46. A microprocessor system 50 connects to the interface 46 through a bus 48. The microprocessor 50 also connects to control system electronics 54 through a bus 52 and to the optical drive 26 through an interface 25. The microprocessor 50 receives commands from the computer system 10 (FIG. 1) through the bus 28, interface 46, and bus 48. These commands direct the autochanger 24 to move cartridges between cells and the optical drive 26 as well as enter and eject cartridges through the mailslot (not shown). The microprocessor performs these commands by interfacing with the optical drive 26 through the interface 25 and by directing two control systems within the autochanger. The control systems have interface electronics 54 which are connected to two motors to drive the mechanical assemblies of the autochanger. The electronics 54 drives a first motor 60 through a pair of connections 64 and receives positional feedback from a shaft encoder 62 via signals 66. The motor 60 is mechanically connected to the autochanger mechanical assemblies 80 through a motor shaft 68. The electronics 54 also drives a second motor 70 through connections 74 and receives positional feedback from a shaft encoder 72 via signals 76. This second motor is mechanically connected to the autochanger mechanical assemblies 80 through a motor shaft 78.

Figure 2A:
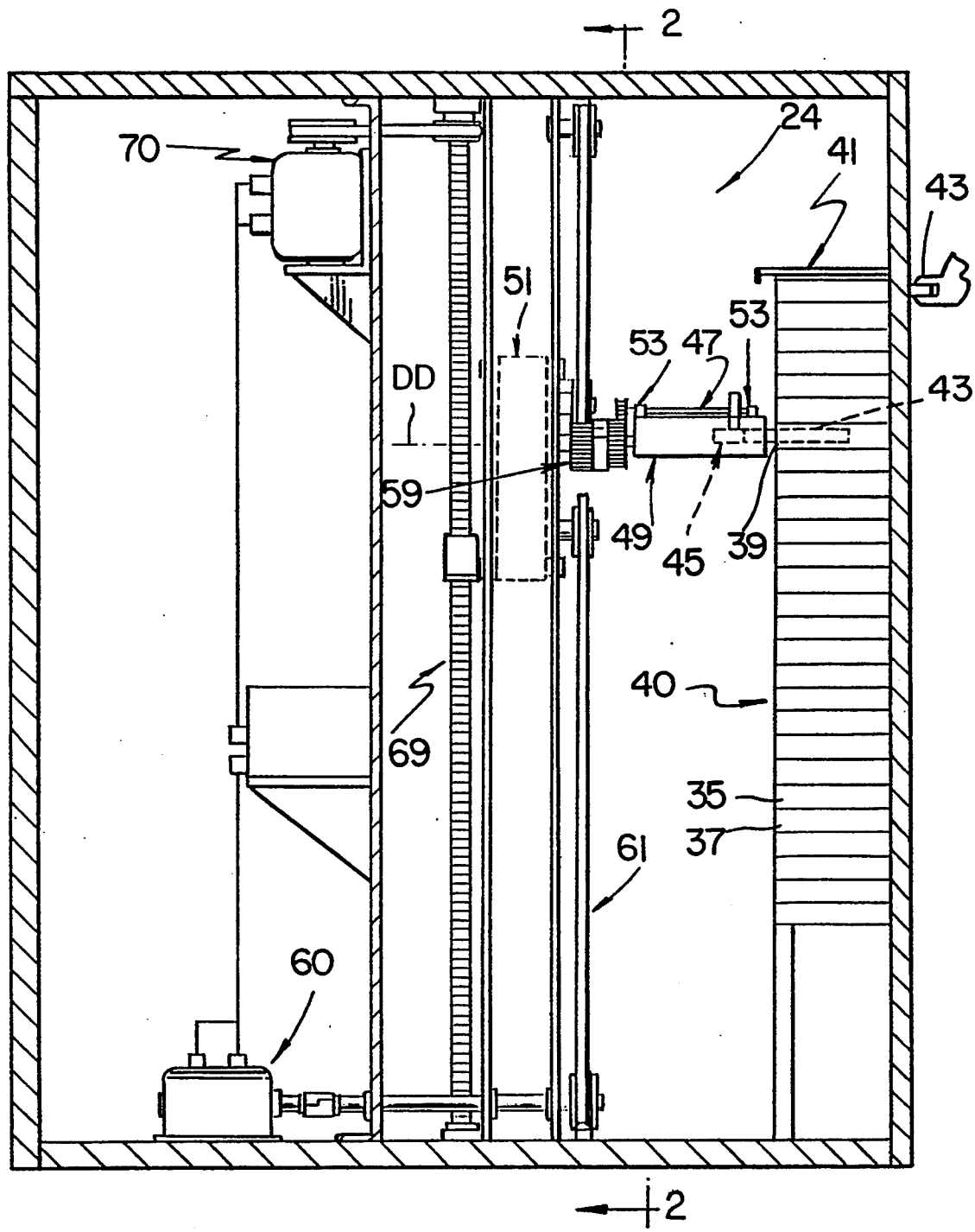
FIGS. 2A and 2B show the mechanical assemblies of the present invention.
Figure 2B:
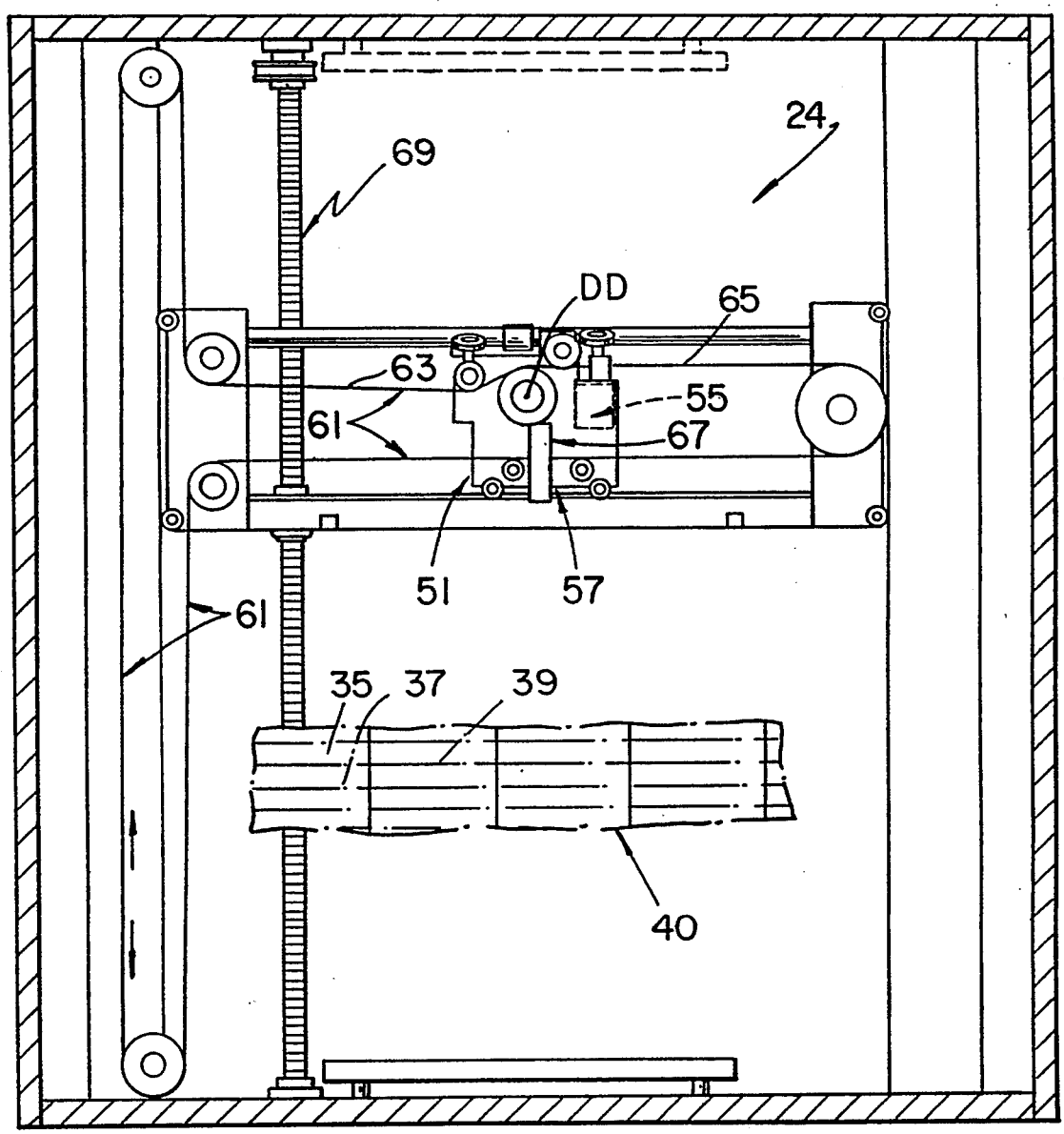

FIGS. 2A and 2B illustrate the mechanical assemblies or mechanisms of the optical disk cartridge handling system 24 for use in association with a plurality of longitudinally extending, rearwardly opening, cells 35, 37, 39, etc., arranged in a laterally and vertically extending cell array 40.

The handling system 24 may comprise an insertion assembly 41 for receiving a cartridge 43 which is hand-inserted by a human operator with a first end of the cartridge positioned forwardly. The insertion assembly longitudinally and rotationally displaces the cartridge so as to present the cartridge to a cartridge engaging mechanism with the first end of the cartridge positioned towards the rear of the housing.

The cartridge engaging mechanism 45 is provided for engaging an exposed end portion of a cartridge positioned in the insertion assembly 41 or in another cell, e.g. 35, 37, 39.

A longitudinal displacement assembly 47 is operatively associated with the engaging mechanism for longitudinally displacing a cartridge 43 engaged by the engaging mechanism 45.

A flipping assembly 49 is operatively associated with the engaging assembly 45 and is used for invertingly rotating a cartridge engaged by the engaging mechanism about a longitudinally extending flip axis DD.

A lateral displacement assembly 51 is operatively associated with the engaging assembly 45 for laterally displacing a cartridge 43 engaged by the engaging mechanism.

A rotatable first motor assembly 60 is drivingly linked to the longitudinal displacement assembly 43, the flipping assembly 49, and the lateral displacement assembly 51 for providing driving force thereto.

Stop assembly 53 may be provided which limits the movement of the longitudinal displacement assembly 47.

A flip latch assembly 55 is provided which has a latched state and an unlatched state and which is operatively associated with the flipping assembly 49 for preventing rotation thereof when the flip latch assembly 55 is in the latched state.

A translation latch assembly 57 is provided which has a latched state and an unlatched state. The translation latch assembly is operatively associated with the lateral displacement assembly 51 for preventing lateral displacement thereof when the translation latch assembly is in the latched state.

The cartridge handling system 24 has a plunge operating state wherein the stop assembly 53 is in disengaged relationship with the longitudinal displacement assembly 47; the flip latch assembly 55 is in its latched state; and the translation latch assembly 57 is in its latched state. The cartridge handling system 24 comprises a flipping operating state wherein the stop assembly 53 is in engaged relationship with the longitudinal displacement assembly 47; the flip latch assembly 55 is in its unlatched state; and the translation latch assembly 57 is in its latched state. The cartridge handling system 24 also comprises a translation state wherein the translation latch assembly 57 is in its unlatched state.

A first gear assembly 59 is provided which is mounted in rotationally displaceable relationship with the lateral displacement assembly 51 and which is drivingly linked to the longitudinally displacement assembly 47 and the flipping assembly 49.

A continuous drive belt assembly 61 is provided which is continuously nonslippingly engaged with the first gear mens 59 for drivingly linking the first gear assembly 59 with the first motor assembly 60. The continuous belt assembly may comprise a first portion 63 extending in a first lateral direction from the first gear assembly 59 and a second portion 65 extending in a second lateral direction from the first gear means. The lateral displacement assembly 51 is laterally displaceable through movement of the continuous belt assembly 61 when the first gear assembly 59 is locked against rotation.

A gear lock assembly 67 having a locked state and an unlocked state is provided which is operatively associated with the first gear assembly 59. The gear lock assembly 67 prevents rotation of the first gear assembly 59 when the gear lock assembly is in its locked state. The cartridge handling system 24 is constructed and arranged such that the gear lock assembly 67 is in its locked state when the translation latch assembly 57 is in its unlatched state, and such that the gear lock assembly 67 is in its unlocked state when the translation latch assembly 57 is in its latched state.

The optical disk cartridge handling system 24 also comprises a vertical displacement assembly 69 for vertically displacing a cartridge 43 engaged by the cartridge engaging assembly 45. A second motor 70 is operatively associated with the vertical displacement assembly 69 for providing driving force thereto.

Figure 3:
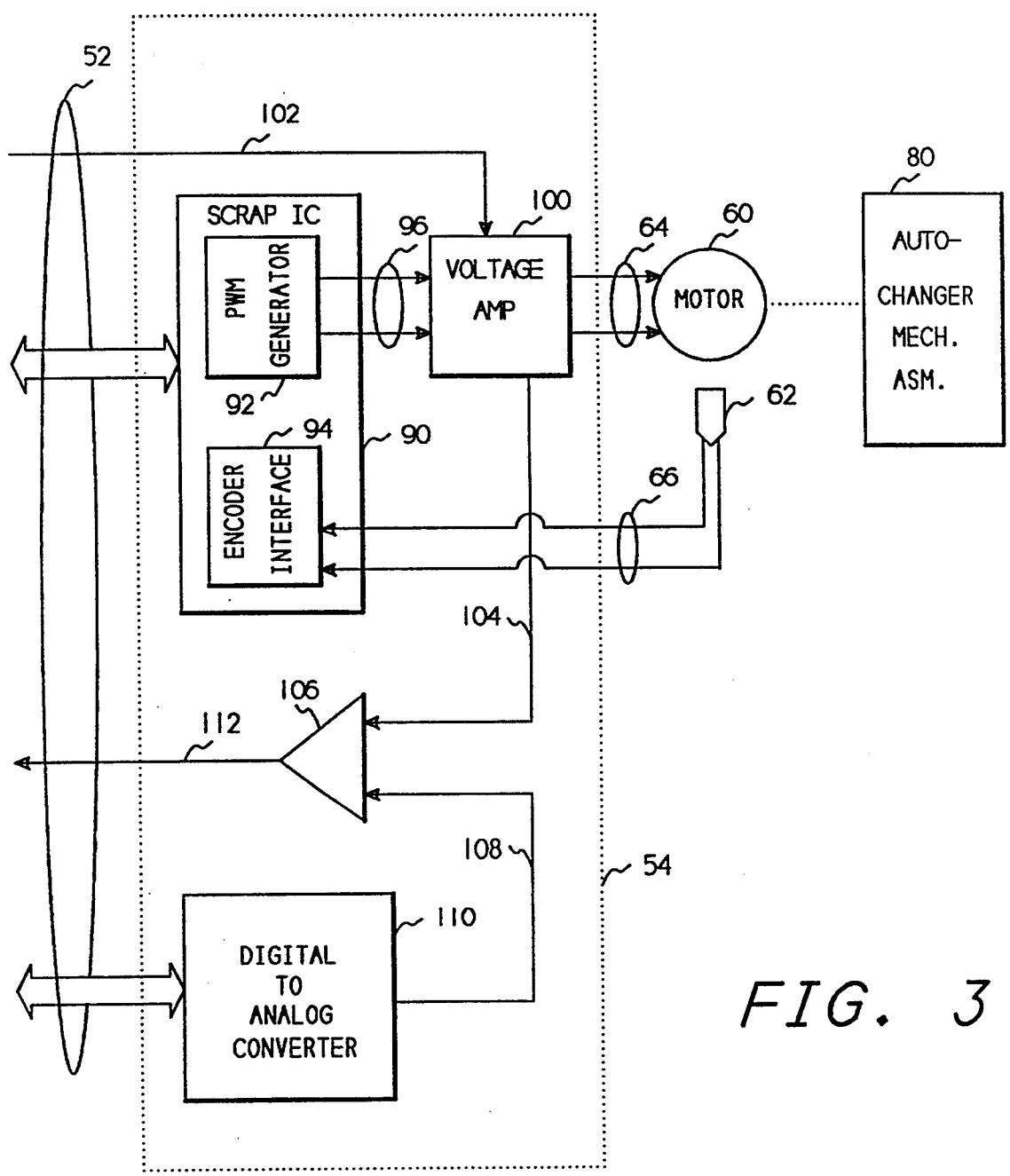
FIG. 3 is a detailed block diagram of the control system interface electronics of the invention.

FIG. 3 depicts a detailed block diagram of the control system electronics, motors, and mechanical assemblies illustrating one of the two control systems of the invention. The method used to drive the motors in the control systems is pulse width modulation ("PWM"), which is commonly used for similar control systems. This method involves controlling motor speed by varying the duty cycle of a constant voltage pulse supplied to the motor, rather than varying the amount of the voltage. Although the PWM method is illustrated, other methods of controlling the motor speed could be used within the scope of the present invention.

Referring now to FIG. 3, the bus 52 transfers data from the microprocessor 50 (FIG. 2) to a pulse width modulation integrated circuit ("IC") 90, which is commercially available as Hewlett Packard part number HCTL-1000. Similar integrated circuits that perform the same functions are available from other manufacturers, such as Motorola part number MC33030, or Silicon General part number SG1731. The IC 90 directly interfaces to the microprocessor bus 52 to allow the microprocessor to write to registers or read from registers within the IC 90 to perform functions necessary to create the PWM output of the IC 90. A PWM generator circuit 92 within the IC 90 accepts a datum from the bus 52 and converts this datum into two, time varying, output signals 96 which are connected to a voltage amplifier 100. Only one of the signals 96 is active at a time, based on the polarity of the datum, and this active signal has a duty cycle which is proportional to the value of the datum—the larger the value, the longer the duty cycle. The signals 96 are amplified by the voltage amplifier 100 to a level suitable for driving the motor 60.

The voltage amplifier 100 can be enabled or disabled from the microprocessor by signal 102.

A shaft encoder 62 (also shown in FIG. 2) is a commercially available part that provides a two channel output of the angular position of the motor shaft. Examples of this part are Hewlett Packard part numbers HEDS-5500, HEDS-6000, and HEDS-9000. The shaft encoder 62 is mounted on the shaft of the motor 60 to form a self contained unit. Inside the shaft encoder is an encoder disc (not shown) with a photo transmitter (not shown) on one side of the disc, and a photo receiver (not shown) on the opposite side of the disc. The disc is transparent except for a series of dark lines printed or etched on its surface. Light from the phototransmitter shines through the disc and as the shaft rotates, a pulse train is generated by the dark lines interrupting the light. Two receivers are used, spaced 90 degrees apart, so the two output channels from the receivers can be used to detect the direction of rotation. The pulse train output by the two channels is fed to an encoder interface and counter section 94 of the IC 90. The phase relationship of the two channels determines whether the motor is rotating clockwise or counterclockwise. The IC 90 decodes the phase and counts the number of pulses generated by the shaft encoder 62 and presents this data to the bus 52 for processing by the microprocessor 50. By obtaining the encoder 62 data from the IC 90, the microprocessor determines the speed and direction of rotation of the motor 60. Counters in the encoder interface 94 also maintain motor shaft position.

The control system interface electronics 54 also includes a means of converting the current running through the motor 60 into a signal which the microprocessor can use to determine the amount of such current. The method measures voltage across a sampling resistor (not shown), in series with the motor leads 64, by inputting this voltage 104 into a differential amplifier 106. There it is compared to a known voltage signal output by a digital to analog converter circuit ("DAC") 110. The microprocessor 50 sends data to the DAC 110 which converts the data to an analog signal 108. This signal 108 is compared by the differential amplifier 106 to the voltage signal 104 that represents motor current. The output signal 112 of the differential amplifier 106 is read by the microprocessor 50 to determine if the DAC output 108 is greater than or less than the voltage value 104 for the motor current. In this way, the microprocessor 50 can change the DAC 110 value until the signal 112 changes value, thus determining the motor current.

Figure 4:
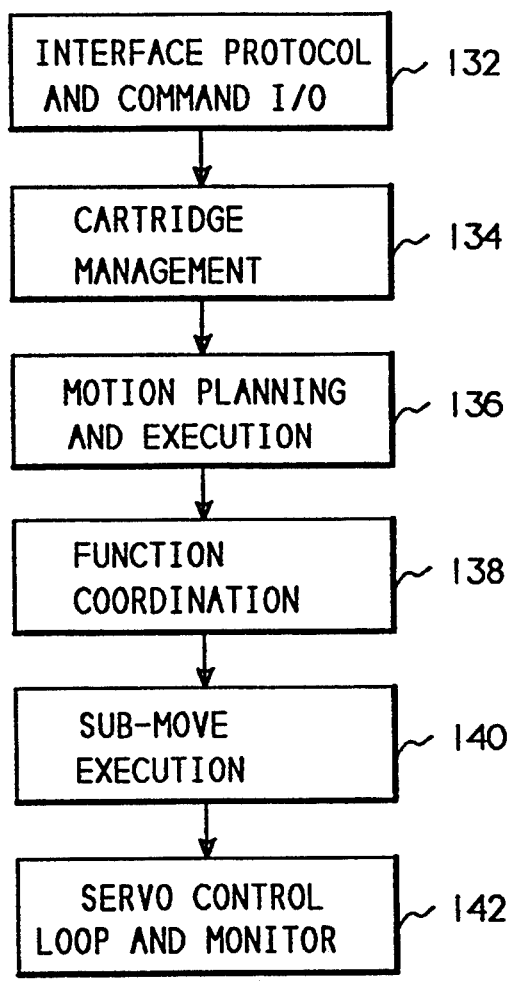
FIG. 4 is a flow diagram of the major modules of the software of the present invention.

FIG. 4 is a high level block diagram of the function to function flow of the software of the present invention. Block 132, interface protocol and command I/O, interacts with the interface electronics 46 (FIG. 2) to receive commands from the computer system 10 (FIG. 1), and to transmit status back to the computer system 10. Block 132 passes the commands to the cartridge management block 134 which is responsible for keeping the logical arrangement of all locations and their corresponding status. Block 134 also translates interface commands from the computer system into autochanger internal command structures that are passed to the motion planning and execution function, block 136. This function transforms a command structure into a series of autochanger sub-commands that will perform the command. Block 136 also sequences the sub-commands to perform the command in the most time-optimal way. Block 138, function coordination, coordinates the series of sub-commands in order to execute the command by modifying the operation of the control systems to properly move each of the required mechanical assemblies. The sub-move execution block 140 performs the lowest level motion in the autochanger in order to perform each sub-command. It coordinates the input position to each of the control systems and generates a move profile for each input based on given acceleration, peak velocity, and force parameters which were supplied by blocks 136 and 138. The servo control loop and monitor, block 142, interfaces with the control system electronics 54 (FIG. 2) to control the position of the motors in the two control systems through a digital compensation algorithm. This block also maintains position, force and velocity data for the two control systems, and it monitors the systems and disables power to the systems if abnormal or unexpected conditions arise.

Figure 5:
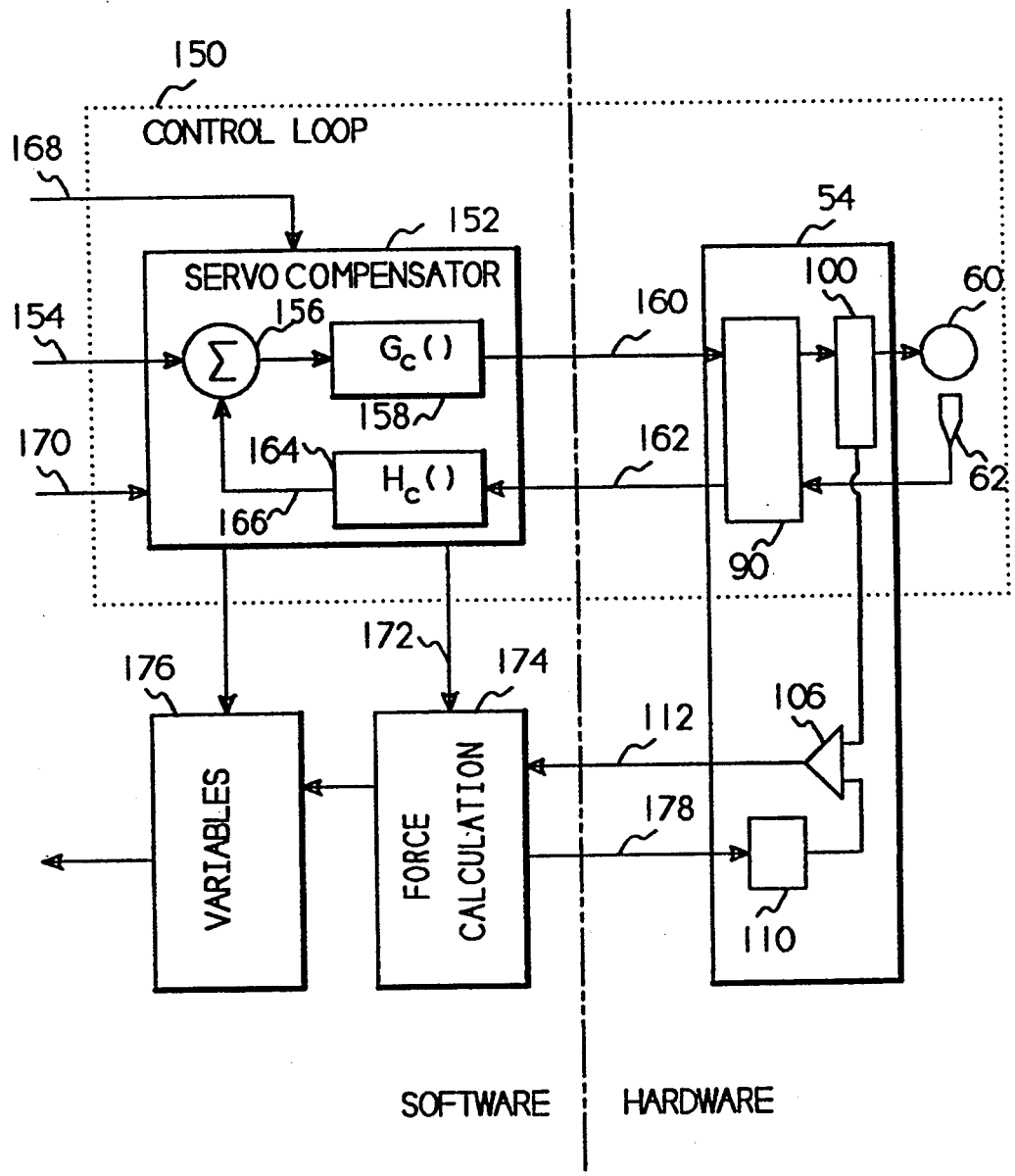
FIG. 5 is a diagram of the servo control system of the present invention.

FIG. 5 shows the servo control system of the present invention. A conventional digital servo control loop 150 is used to control a motor for a control system. The present invention has two such control loops, designated Y control loop, and Z control loop. Each control loop has a servo compensator 152 which inputs a position signal 154 to a summing junction 156. The output of the summing junction 156 is fed to an output transfer function $G_c()$ which converts the output of the summing junction 156 to a signal 160 by multiplying the output 156 by a constant $K_p$. $K_p$ is shown in table 1 for each move of each control system. The resulting value is fed to the IC 90 in the control system interface electronics 54. The signal is then amplified by the amplifier 100 and input to the motor 60. A shaft encoder 62 sends information to the IC 90 which feeds position and velocity information through signal 162 to the feedback transfer function $H_c()$ 164. The feedback transfer function 164 converts the position and velocity information into a negative feedback signal 166 which is input to the summing junction 156. The function $H_c()$ is:

$$H_c() = 1 + K_v d/dt$$

where d/dt is the derivative of the input 162 and $k_v$ is a constant value. $K_v$ is shown in table 1 for each move of each control system. Thus $H_c()$ adds the output position to the derivative of the output position times a constant $K_v$. The values for $K_p$ and $K_v$ depend upon the accuracy and stability requirements for the systems. Increasing $K_p$ reduces position error. Both $K_p$ and $K_v$ determine the control system's stability and performance. In this manner, the control loop 152 changes the position of the motor 60 whenever a new position is received on line 154. As will be described later, the motor 60 may have different loads at different times. To compensate for these different loads, the different compensator values $K_p$ and $K_v$ may be input to the servo compensator 152 by a compensator values signal 168. Also, in the event software determines that the control system must be stopped, a shutdown signal 170 is input to the servo compensator 152 to cause the shutdown.

The force calculation module 174 determines the amount of force being exerted by the motor. It receives compensator values and motor speed from the compensator 152 through signal 172. The mechanical sense of touch of the present invention is the calculation of forces being exerted by the autochanger's control systems and the ways in which the force information is used during the autochanger's operation. This mechanical sense of touch uses knowledge of the mechanical parameters of the system to derive the amount of force being exerted by the systems' motors onto the mechanics. A periodic calculation of the force is made by the force calculation module 174 and is made available to other software modules within the system by placing the force information into a variables memory area 176. This force information is used by the other software modules as a sensing mechanism for positional feedback and for detection of abnormal situations within the autochanger. Force is directly related to motor torque by the equation $$F = T_m/r$$

where F is the exerted force created by the motor torque, $T_m$, operating at an effective radius r, where r is determined by the gearing used to attach the autochanger mechanics to the motor assembly, and / represents division. Motor torque is directly related to motor current by the equation $$T_m = I_m * K_t$$

where $I_m$ is the instantaneous motor current and $K_t$ is the motor's torque constant, and * represents multiplication.

Motor current can be calculated by direct measurement via electronics, or by calculation from knowledge of motor voltage and motor speed. The resulting equation becomes $$\begin{aligned} F &= T_m/r \\ &= (K_t/r) * I \end{aligned}$$

In the present invention, the direct measurement is accomplished by a combination of electronics and software. As described above with reference to FIG. 3, a voltage proportional to motor current from the amplifier 100 is compared to the output of a DAC 110 by a differential amplifier 106. The force calculation module 174 sends a value to the DAC 110 via signal 178, and receives the comparison of this value to the voltage proportional to the motor current via signal 112. The software 174 changes this value until the signal 112 indicates an equal comparison, then the value represents the motor current. Since $K_t$ and r are constants, a new constant K can be calculated in advance, and the resulting equation is $$F = K * I$$

Motor current can also be calculated by the equation $$I_m = (V_m - (K_t * w))/R$$

where $V_m$ is the motor voltage, $K_t$ is the torque constant of the motor, R is the resistance of the motor and associated driver circuits for the motor, and w is the radian velocity of the motor shaft. Since a digital controller is used in the control loop 150, $V_m$ and w are already available in digital form. A simple calculation of the force is made via the equation:

$$\begin{aligned} F_m &= (K_t/(r * R)) * (V_m - (K_t * w)) \\ &= (K_1 * V_m) - (K_2 * w) \end{aligned}$$

where $K_1 = K_t/(r*R)$ and $K_2 = K_t^2/(r*R)$.

As will be described below, force information is used extensively throughout the controller software as a form of feedback and obstacle detection. The controller can sense the completion of an operation by monitoring the force at strategic times during execution of an operation. The controller can adjust the movements of the motors until a desired force or opposition is obtained. Abnormal situations, which warrant immediate stoppage of all movements, can also be detected by monitoring the force.

After calculation, the force is stored in the variables memory area 176.

Basic Operations

Figure 6:
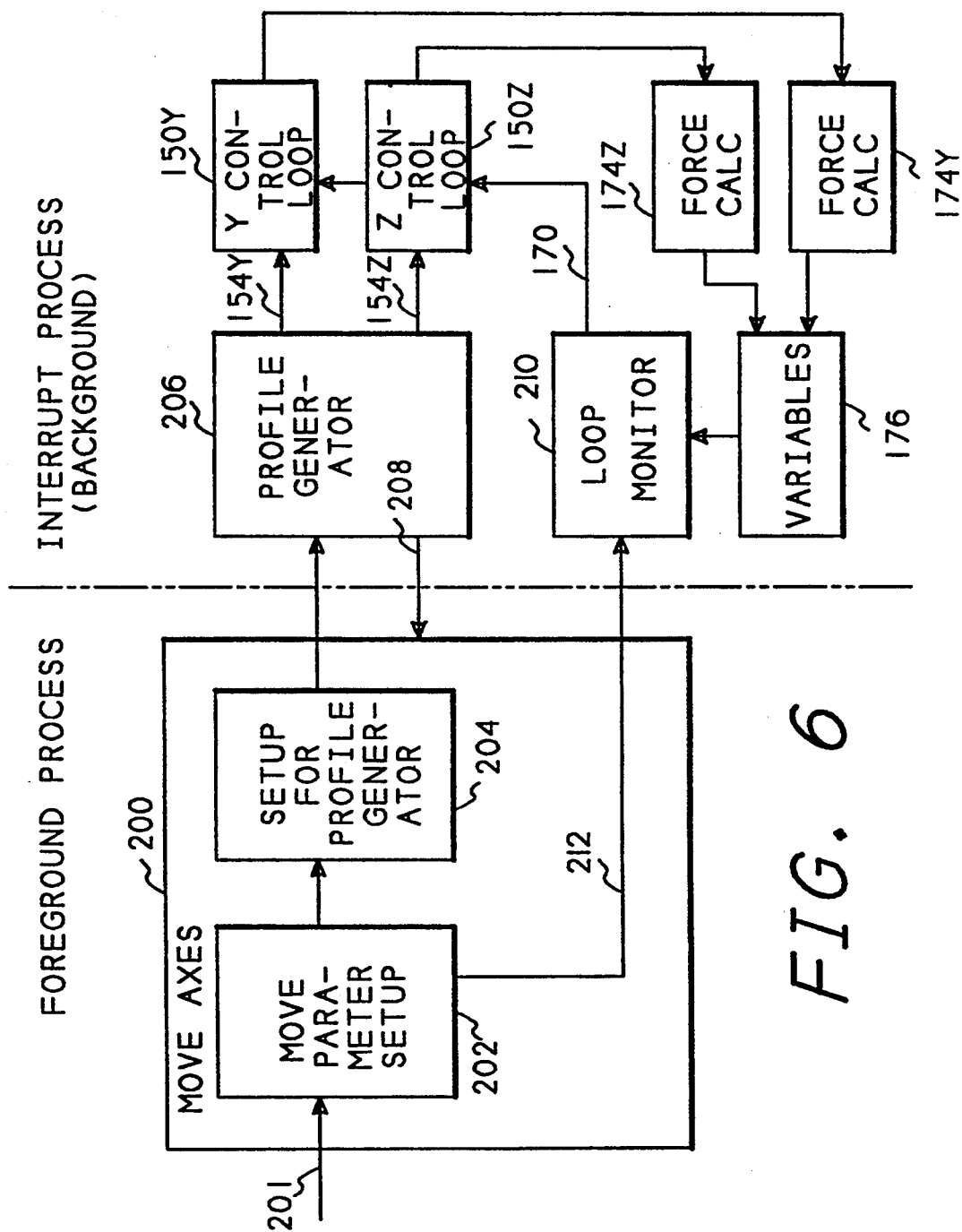
FIG. 6 is a block diagram of the major modules and data flow involved in a move operation.

Referring now to FIG. 6, a block diagram showing the major modules and data flow involved in a move operation is depicted. A move axes module 200, which is one of the sub-move execution modules 140 (FIG. 4), receives input parameters 201 containing delta Y, delta Z, and ID values. Delta Y and delta Z are the number of shaft encoder counts between the current position and the new position. The ID value is used as an index into a look-up table to retrieve the force values that are then passed to loop monitor 210 through signal 212. The table also provides acceleration, in millimeters per second per second, and velocity in millimeters per second, for input to block 204. Table 1 shows the force values, acceleration (Accel) and velocity ($V_p$) for each of the control systems operations. Block 204 converts the acceleration and velocity parameters into data for the profile generator, and provides scaling information for the profile generator. Block 204 then initiates the movement. Once the movement is started, periodic timer interrupts will transfer control to the profile generator 206. Using the parameters passed from block 204, the profile generator 206 dynamically builds a position profile of how the movement should occur. This profile includes Y and Z positions over time, and these positions are passed to the Y control loop 150Y via signal 154Y, and to the Z control loop 150Z via signal 154Z. The control loops were described with reference to FIG. 5. As movement of the mechanisms occurs, the control loops send information to force calculation modules 174Y and 174Z (which were described with reference to FIG. 5), that store force information in the memory variables 176. When the setup was being performed by block 202, shutdown force settings were passed to loop monitor 210 via signal 212. The loop monitor 210, described below, compares the shutdown force settings to the forces in the memory variables 176, and shuts down the control loops 150Y and 150Z if the forces exceed safe limits. When the movement is complete, a done signal 208 is returned to the move axes module 200 which, in turn, notifies its caller that the move is complete. Note that the profile generator, control loops, and loop monitor run as background, interrupt driven modules, so the control system is constantly being serviced.

Figure 7:
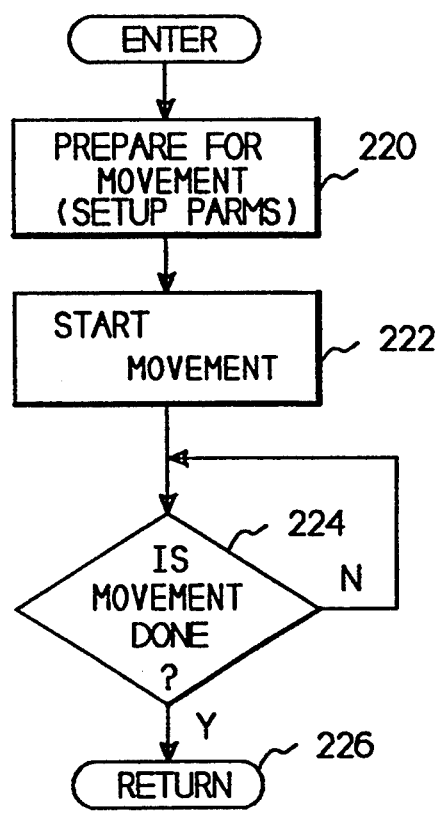
FIG. 7 is a flowchart of a move operation.

FIG. 7 depicts the move axes module process as a control flowchart. After entry, block 220 prepares for movement by setting up the move parameters and the profile generator, block 222 starts the movement, and block 224 just waits on the background processes to complete the move. After completion, control is returned to the caller at block 226.

Figure 8:
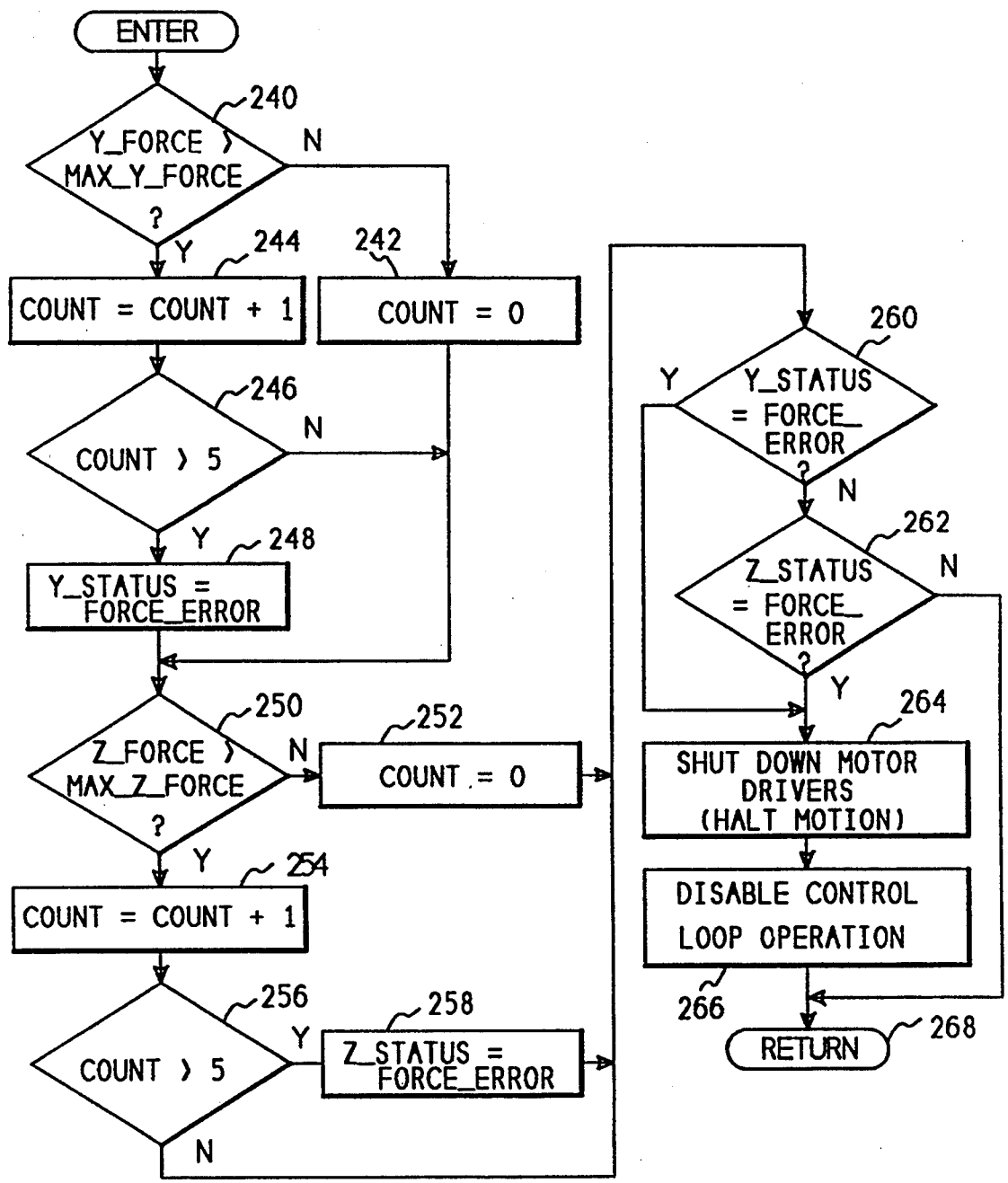
FIG. 8 is a flowchart of the loop monitor that continuously monitors the forces exerted by the control systems.

FIG. 8 is a flowchart of the loop monitor block 210 (FIG. 6). This module receives maximum force parameters from the move parameter setup block 202 and compares these force values with the force being exerted by the motors, each time it receives control. If the force being exerted exceeds the maximum values, the control systems are both shut down. Referring now to FIG. 8, after entry via a timer interrupt, block 240 compares the force being exerted by the Y control system to the maximum Y force passed from the move parameter setup. If the force is less than or equal to maximum Y force, control transfers to block 242 where a count value is set to zero. The count is used to allow the force to exceed the maximum value for a short period of time without causing shutdown, however, if the force exceeds the maximum value for a longer period, a shutdown will occur. To ensure that the high force occurs over a long period of time, the module sets the count value to zero anytime it gets control and the force is below the maximum.

If the force is greater than the maximum, block 244 increments the count, then block 246 evaluates the count. If the count is greater than a value necessary to ensure that the count has been high for the maximum time allowed, control transfers to block 248 where Y__status is set to force_error, which will cause shutdown. In either case, control transfers to block 250 where the Z force is compared to the maximum Z force. If Z force is less than the maximum, block 252 sets the count to zero, otherwise, block 254 increments the count. Block 256 evaluates the count and if it is large enough, control transfers to block 258 to set Z__status to force_error, which will cause a shutdown.

Control then goes to block 260 and block 262 to check for either a Y__status of force_error or a Z__Status of force_error. If either condition is true, control goes to block 264 to shut down the motor drivers to halt motion, then block 266 disables the control loop so that no new commands go to the motors. If neither block 260 nor block 262 detect an error condition, or after a shutdown, control transfers to block 268 to return from the interrupt.

Figure 9:
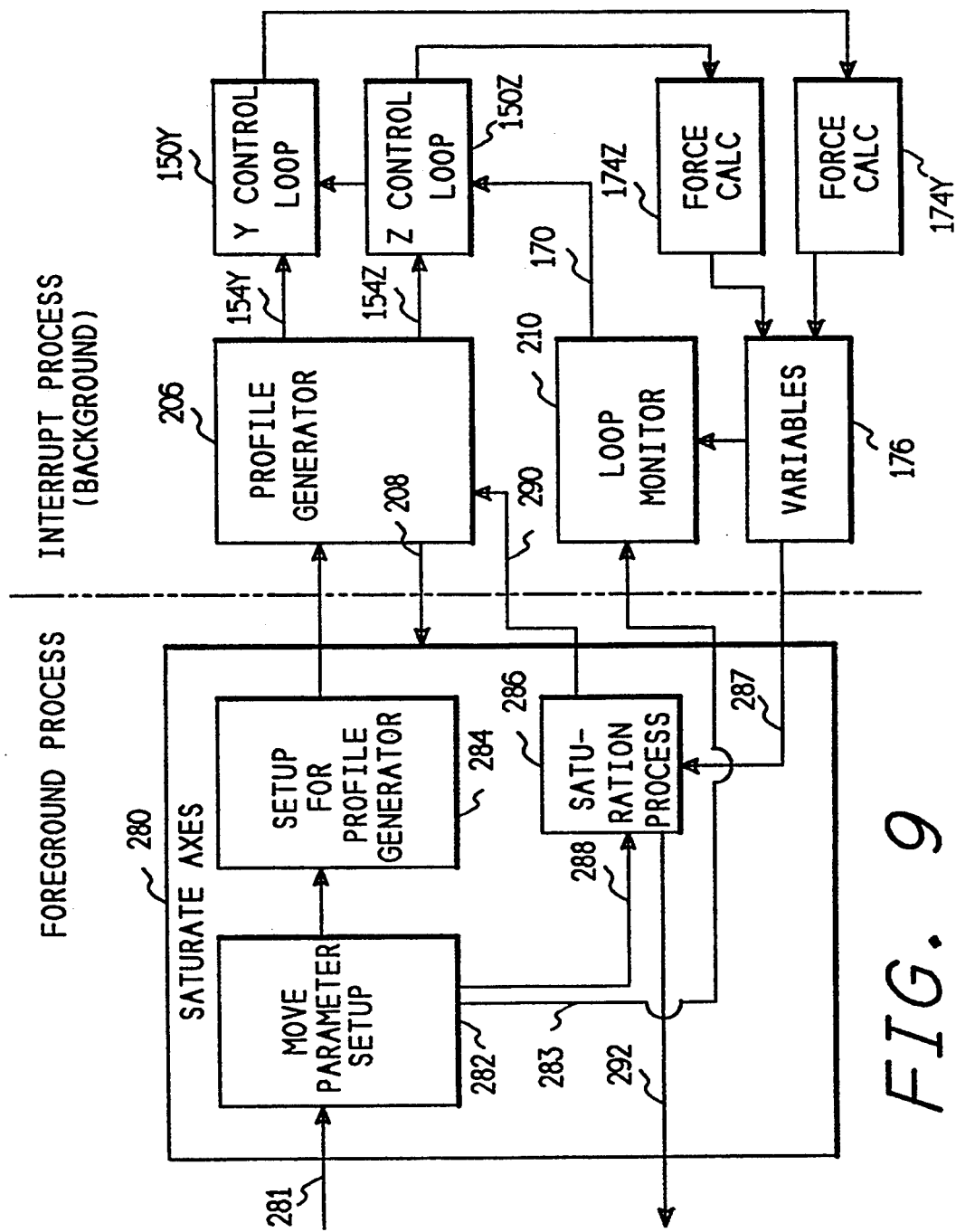
FIG. 9 is a block diagram of the major modules and data flow involved in a saturate operation.

FIG. 9 is a block diagram of a saturate axes operation showing data flow. This operation is like a move operation, except that movement stops either when the destination is reached, or upon detection of a specified force opposing the movement. Referring now to FIG. 9, a saturate axes module 280, which is one of the sub-move execution modules 140 (FIG. 4), receives input parameters 281 containing delta Y, delta Z, and ID values. Delta Y and delta Z are the number of shaft encoder counts between the current position and the new position. The ID value is used as an index into a look-up table to retrieve the force values that are then passed to loop monitor 210 through signal 283. The table also provides acceleration, in millimeters per second per second, and velocity in millimeters per second, for input to block 284. Block 284 converts the acceleration and velocity parameters into data for the profile generator, and provides scaling information for the profile generator. Block 284 then initiates the movement. Once the movement is started, periodic timer interrupts will transfer control to the profile generator 206, which is the same as the profile generator of FIG. 6. Using the parameters passed from block 284, the profile generator 206 dynamically builds a position profile of how the movement should occur. This profile includes Y and Z positions over time, and these positions are passed to the Y control loop 150Y via signal 154Y, and to the Z control loop 150Z via signal 154Z. The control loops were described with reference to FIG. 5. As movement of the mechanisms occurs, the control loops send information to force calculation modules 174Y and 174Z (which were described with reference to FIG. 5), that store force information in the memory variables 176. When the setup was being performed by block 282, shutdown force settings, which are twice the value of the threshold force settings, were passed to the saturation process 286 via signal 288. Threshold force settings were passed to loop monitor 210 via signal 283. The loop monitor 210, described above, compares the shutdown force settings to the forces in the memory variables 176, and shuts down the control loops 150Y and 150Z if the forces exceed safe limits. When the movement is complete, a done signal 208 is returned to the saturate axes module 200 which, in turn, notifies its caller that the operation is complete. The saturate process 286 also monitors variables 176, via signal 287, to determine when they exceed the threshold values passed from block 282, and when either force exceeds the threshold, movement is stopped through the stop signal 290. At this time saturate status is made available through status signal 292. Note that the profile generator, control loops, and loop monitor run as background, interrupt driven modules, so the control system is constantly being serviced. The saturate process runs in a foreground loop.

Figure 10:
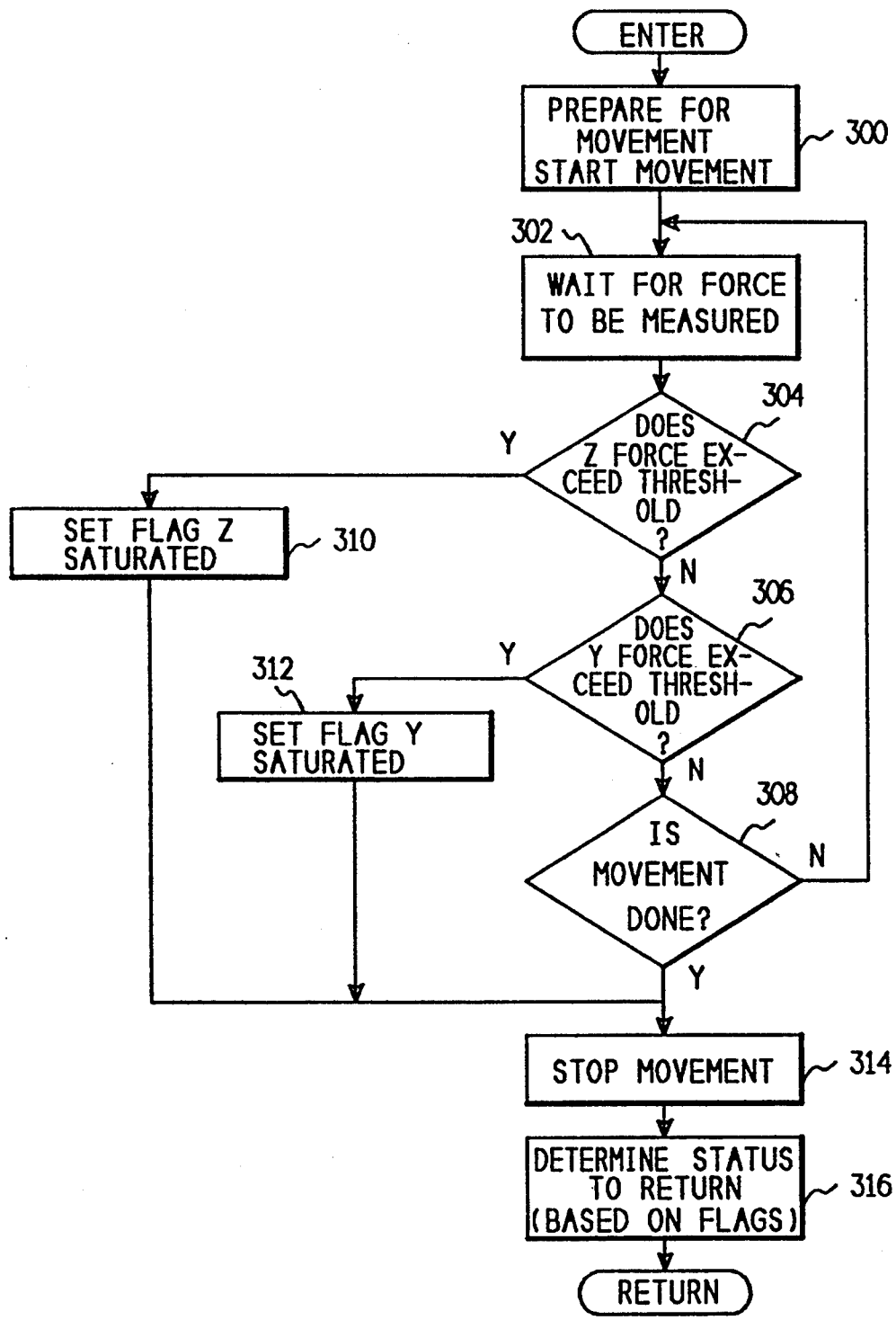
FIG. 10 is a flowchart of the saturate operation.

FIG. 10 is a flowchart of the saturate axes operation. After entry, block 300 prepares for movement by processing the input parameters, delta Y and delta Z, passing shutdown force values to the loop monitor, profile parameters to the profile generator, threshold force values to the saturation process, and then starting the movement. Block 302 waits for a force value to be measured (by the timer interrupt driven force calculation modules), then block 304 determines if the Z force exceeded the Z threshold. If the force did not exceed the threshold, control passes to block 306 to check the Y force value against the Y threshold parameters. If both forces are less then the threshold, control goes to block 308 to determine if the movement is done, that is, has the movement reached the final position. If the movement is not done, control goes back to block 302 to perform the same checks. If the Z force exceeds the threshold, control goes to block 310 to set the Z saturated flag; if the Y force exceeds the threshold, control goes go block 312 to set the Y saturated flag. In either case, or if movement is done, control goes to block 314 to stop movement. Block 316 then determines status to return and returns to the caller.

The move axes and saturate axes routines described above will be used in the following routines that perform specific operations. Each of the following specific move routines are part of the function coordination routines 138 of FIG. 4. In the following descriptions, note that the Y control system moves the engaging, flipping and longitudinally displacing apparatus, also called the transport, vertically, and the Z control system plunges the engaging mechanism inward to retrieve a cartridge, plunges the engaging mechanism outward, flips the transport, and performs the translation movement of the transport. The Z control system also moves the cartridge insertion mechanism of the mailslot. For a more complete description of the mechanical assemblies of the invention, refer to the foregoing patent application (E).

Translate Operation

Figure 11:
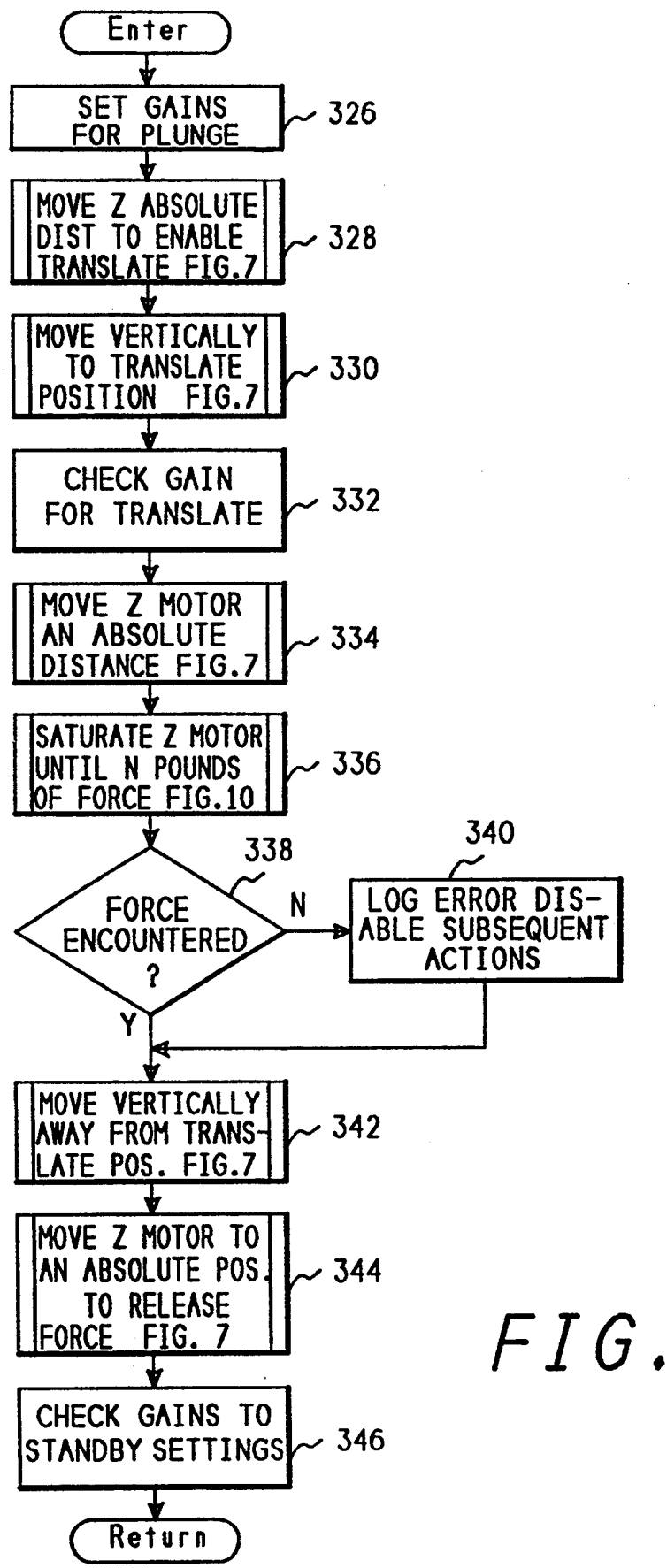
FIG. 11 is a flowchart of a translate operation.

FIG. 11 is a flowchart of a translate operation wherein the transport is moved from one column to the other. This operation involves moving the transport to a position at the bottom of the columns to unlatch the lateral displacement latch. When unlatched, the lateral displacement latch allows the transport to move laterally under control of the Z control system. After the Z control system moves the transport to a new location, the Y control system moves the transport upward to allow the lateral displacement latch to latch, and prevent further lateral displacement.

Referring now to FIG. 11, after entry, block 326 sets the control system gains for a plunge and block 238 moves the engaging mechanism back to a position that will allow the lateral displacement latch to unlatch. Then block 330 calls the move axes module to move the transport to a position at the bottom of the columns which unlatches the lateral displacement latch. Once the lateral displacement latch is unlatched, the transport can be moved laterally, however, this movement presents a new set of plant parameters to the Z control system. That is, a different inertia, and a different friction component are encountered by the Z control system during this movement. Consequently, block 332 changes the gain parameters to the Z control system for this movement. These parameters are shown as signal 168 on FIG. 5. Once the gains have been changed for the translate, block 334 calls move axes to move the transport (by moving the Z motor) to a position near the desired new position at the other column. Block 336 then calls saturate axes to move the transport until N pounds of force are encountered (see table 1 for a definition of N and distance). This operation completes the movement by moving the transport against a mechanical stop. This stop adjusts for manufacturing tolerances in the mechanical location of the new position. After return from the call to saturate, block 338 determines if the force was encountered, and if the force was not encountered, block 340 logs an error in order to disable subsequent functions. In either case, block 342 moves the Y control system vertically away from the translate position, which allows the lateral displacement latch to re-latch, and block 344 moves the Z control system to a new absolute position to remove tension from the system. Block 346 then resets the control system gains for subsequent plunge operations before control is returned to the caller.

Autochanger—Optical Drive Operation

Figure 12:
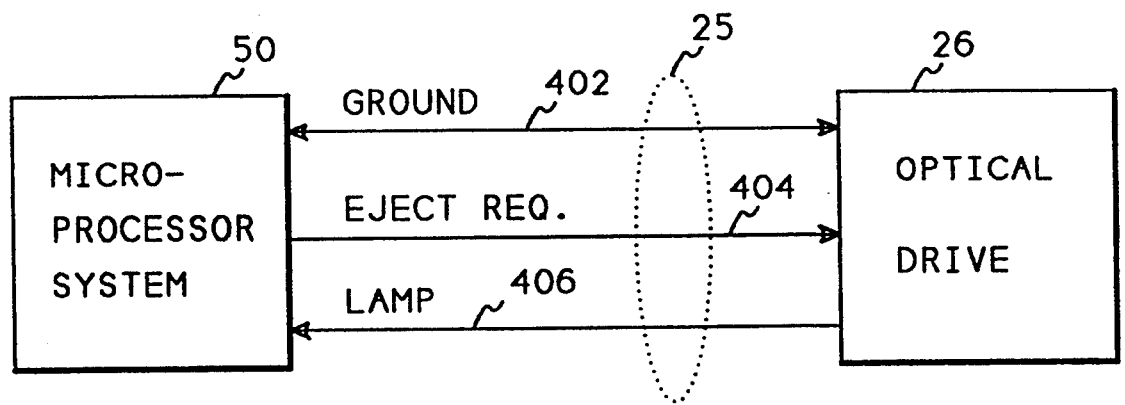
FIG. 12 is a block diagram of the electrical interface between the optical drive and the autochanger.

FIG. 12 shows the interface between microprocessor 50 within the optical disk handling device 24 and the optical drive 26. Referring now to FIG. 12, the interface 25 (also shown in FIG. 2) is shown having a ground signal 402, that serves as an electrical reference for an eject request signal 404 and lamp signal 406. The eject request signal 404 is used by the microprocessor system 50 of the optical disk handling system 24 to signal the optical disk drive 26 to eject any cartridge presently in the optical drive 26. The lamp signal 406 is used by the optical drive 26 to signal one of four different functions to the microprocessor system 50. The first of these functions signaled by the lamp signal 406 is a fault indication that the optical drive 26 has failed a power on self test. The second function indicated by the lamp signal 406 is that the optical drive 26 is busy performing an operation. The third function signaled by the lamp signal 406 is that the optical drive is performing an eject operation, and the fourth function signaled by the lamp signal 406 is that the optical drive is spinning up and testing a cartridge currently in the optical drive 26.

In the operation of the optical drive 26, the lamp signal 406 will go to a "on" state at power up and stay "on" during the power up and self test. When the drive completes the self test successfully, the lamp signal 406 will go to an "off" state. If self test fails, the lamp signal will remain in the "on" state. The self test performed by the optical drive 26 may include read and write tests if a cartridge is present in the drive during power on. While the optical drive 26 is performing a seek operation, read operation, or a write operation, the lamp signal 406 will switch between the "on" and "off" states at a rate of approximately 0.2 to 1 second. When the microprocessor system 50 sends an eject request signal 404 to the optical drive 26, the drive begins its eject sequence, and places the lamp signal 406 into the "on" state for at least one second. After one at least second, and after the cartridge has been raised and let go for eject, the optical drive 26 places the lamp signal 406 into the "off" state. Because the "on" time during an eject operation is longer than the cycle time during a busy signal, the eject can be discerned from busy. If there is no cartridge present in the optical drive 26 the eject signal will still cause the optical drive to place the lamp signal 406 into the "on" state for at least one second before placing the lamp signal 406 into the "off" state. If the optical drive 26 is unable to perform the eject operation, the lamp signal 406 will not go into the "on" state. When a cartridge is inserted into the optical drive 26, the lamp signal 406 will go to the "on" state and remain in that state until the media within the cartridge has reached operational speed, the optical drive has completed focus, and is ready to read or write on the media. At that time the optical drive 26 will change the lamp signal 406 to the "off" state.

Figure 13A:
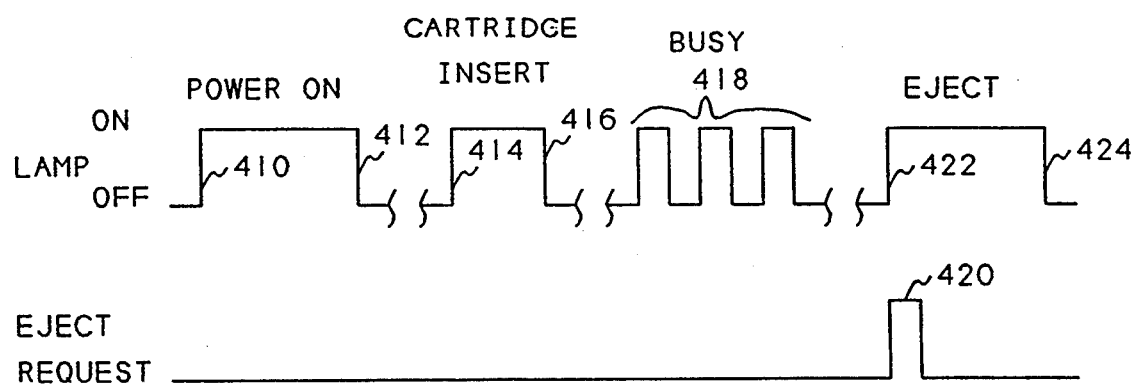
FIGS. 13A–13D are timing diagrams of the operation of the interface signals of FIG. 12.

FIG. 13A through 13D are timing diagrams of the lamp signal 406, having different "on" state pulse widths and the eject request signal 404. Referring now to FIG. 13A, the lamp signal 406 goes from the "off" state to the "on" state at 410 when power on occurs, and remains in the "on" state until 412 when the self test has completed. When a cartridge is inserted into the optical drive 26, the lamp goes from the "off" state to the "on" state at 414 while the media within the cartridge is brought up to speed. At location 416 the lamp signal 406 goes from the "on" state to the "off" state to signal that the optical drive 26 is ready to begin operations. During a read, write or seek operation, the lamp signal 406 switches from the "off" state to the "on" state at a rate between 0.2 and 1 cycle/second, as shown at location 418 of FIG. 13A. When the microprocessor system 50 sends an eject request signal as shown at location 420 of FIG. 13A, the lamp signal 406 goes from the "off" state to the "on" state as shown at 422 and remains in the "on" state until the eject is complete or one second has passed as shown at 424.

Figure 13B:
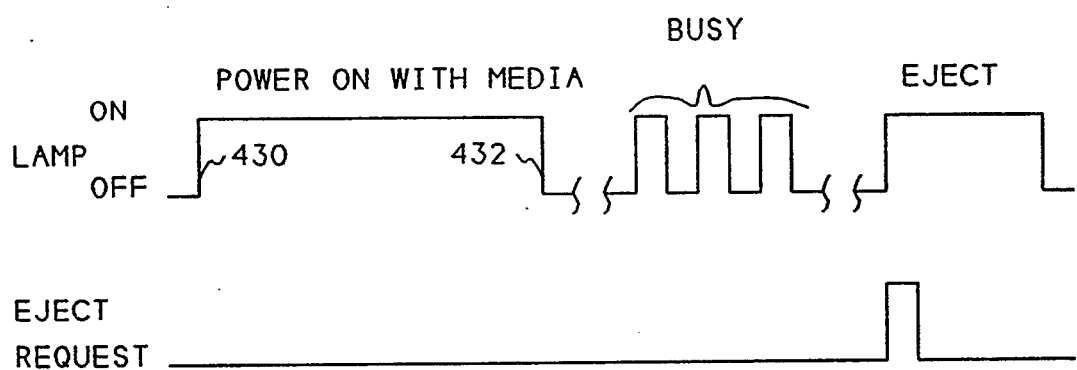

FIG. 13B shows a timing diagram similar to that of FIG. 13A. FIG. 13B, however, shows a power on cycle wherein a cartridge is present in the optical drive 26 during the power on process. When power is received by the optical drive 26, the lamp signal 406 switches from the "off" state to the "on" state at 430, and remains in the "on" state until the self test has completed and the media has been placed in an operational state, then the lamp signal 406 returns to the "off" state at 432.

Figure 13C:
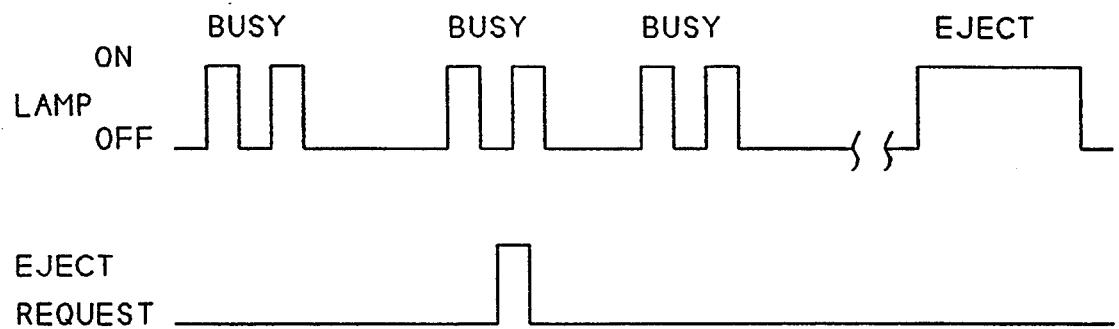

FIG. 13C shows a timing to diagram similar to FIG. 13A. FIG. 13C illustrates that when the optical drive 26 receives an eject request signal while performing some other operation, the optical drive 26 will complete the other operations, as shown by the numerous busy indicators of the lamp signal 406, before starting the eject sequence.

Figure 13D:
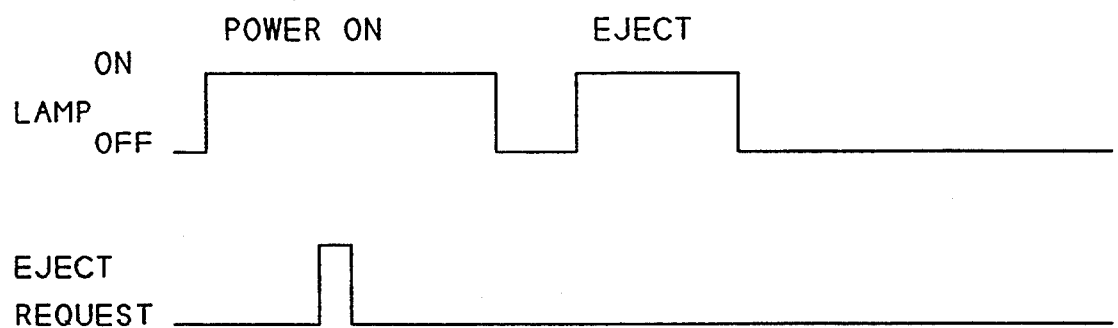

FIG. 13D is a timing diagram similar to 13A also. FIG. 13D shows that if the optical drive receives an eject request during the power on sequence, it will complete the power on sequence taking the lamp signal 406 to the "off" state before starting the eject sequence.

Figure 14:
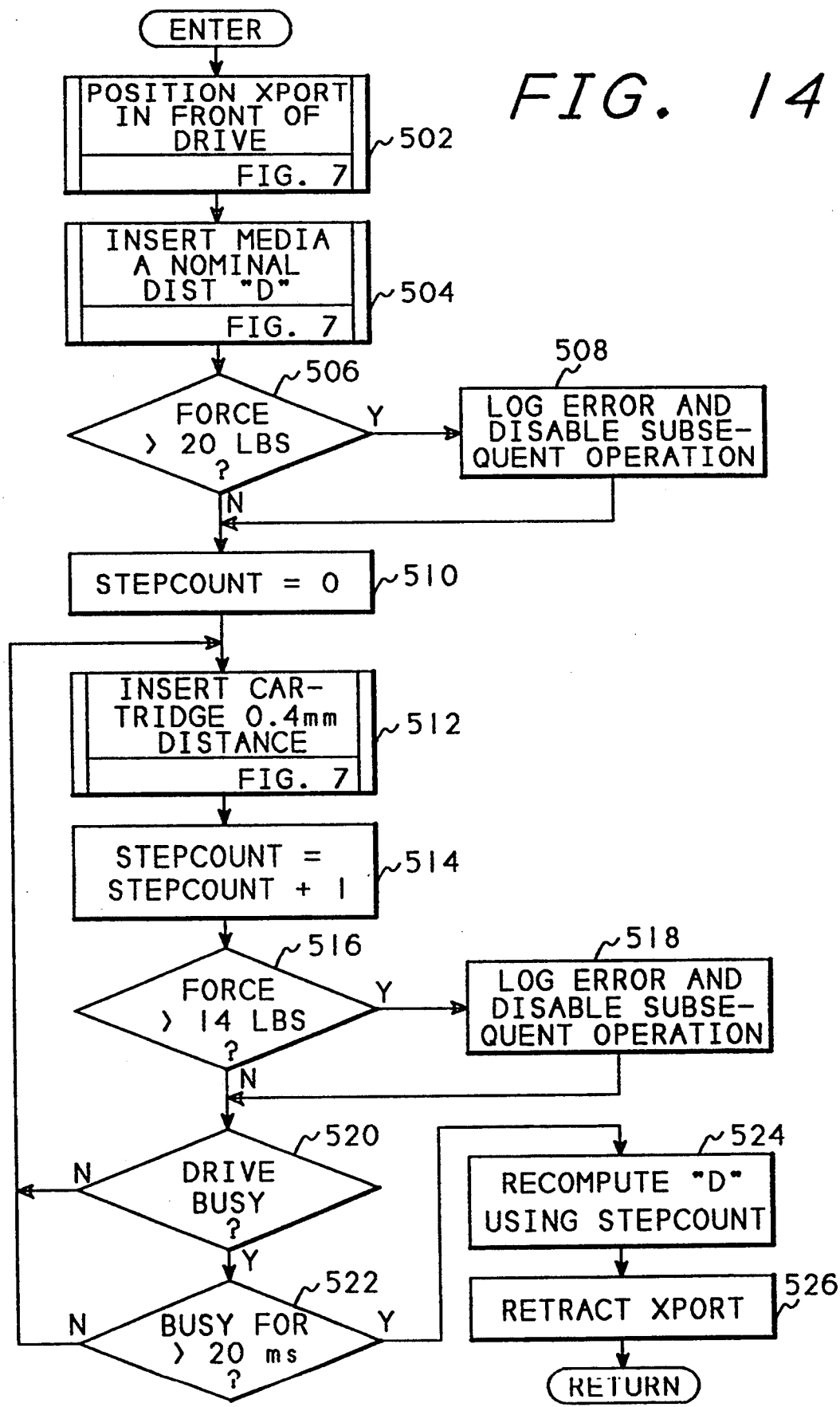
FIG. 14 is a flowchart of the operation to insert a cartridge into the optical drive.

FIG. 14 shows a flowchart of the process of inserting a cartridge into the optical drive. Referring now to FIG. 14, after entry, block 502 calls FIG. 7 to position the transport in front of the drive, aligned vertically to the center of the drive. Block 504 starts the insert process by inserting the media a nominal distance into the drive. This nominal distance "D" is based on an adaptive algorithm that inserts the media 1.6 millimeters before the point at which busy was asserted on the previous insert into the drive. The first time an insert occurs (after power up), the distance inserted will be 4.5 millimeters from the drive's internal hard stop. After this initial insertion, block 506 checks to determine if the force applied by the transport to the media exceeds 20 pounds. If the force exceeds this amount, block 506 transfers to block 508 where an error is reported and the system is disabled for subsequent operations. The shutdown should ordinarily not occur because the media is inserted 1.6 millimeters short of the last successful insertion. If an error has occurred at this point, operations are disabled in a manner that allows the flowchart to continue through its normal path. In either case the flowchart continues at block 510 where a step count value is set to zero. Block 512 then calls FIG. 7 to insert the media an additional 0.4 millimeters into the drive. Then block 514 increments the step count by one and block 516 checks for a force greater than 14 pounds. If an over-force condition has occurred, block 516 will transfer to block 518 which will log an error and disable subsequent operations. In either case the flowchart continues with block 520 which checks to determine if the drive has indicated busy. If the drive has not indicated busy, control transfers back to block 512 to insert the media an additional 0.4 millimeters and continue the loop. If the drive has asserted busy in block 520, block 520 transfers to block 522 which waits to determine if the busy status remains for at least 20 milliseconds. If the busy status does not remain for 20 milliseconds, block 522 transfers back to block 512 to continue the loop. If busy remains up for 20 milliseconds, block 522 transfers to block 524, which recomputes the nominal distance "D" for the next insertion operation. Block 524 computes this distance by determining the distance it took to complete the insert, subtracting 1.6 millimeters from it, and storing this result as the new value for "D". The distance necessary to complete the insert is based on the original value for "D" (in step 504 above) plus the number of 0.4 millimeters steps (step count value) necessary before busy was asserted by the drive. This new value for "D" will be used in subsequent operations for the initial media insert into the drive. After recomputing "D" block 524 transfers to block 526 which retracts the transport from the drive and then returns to the caller.

Figure 15:
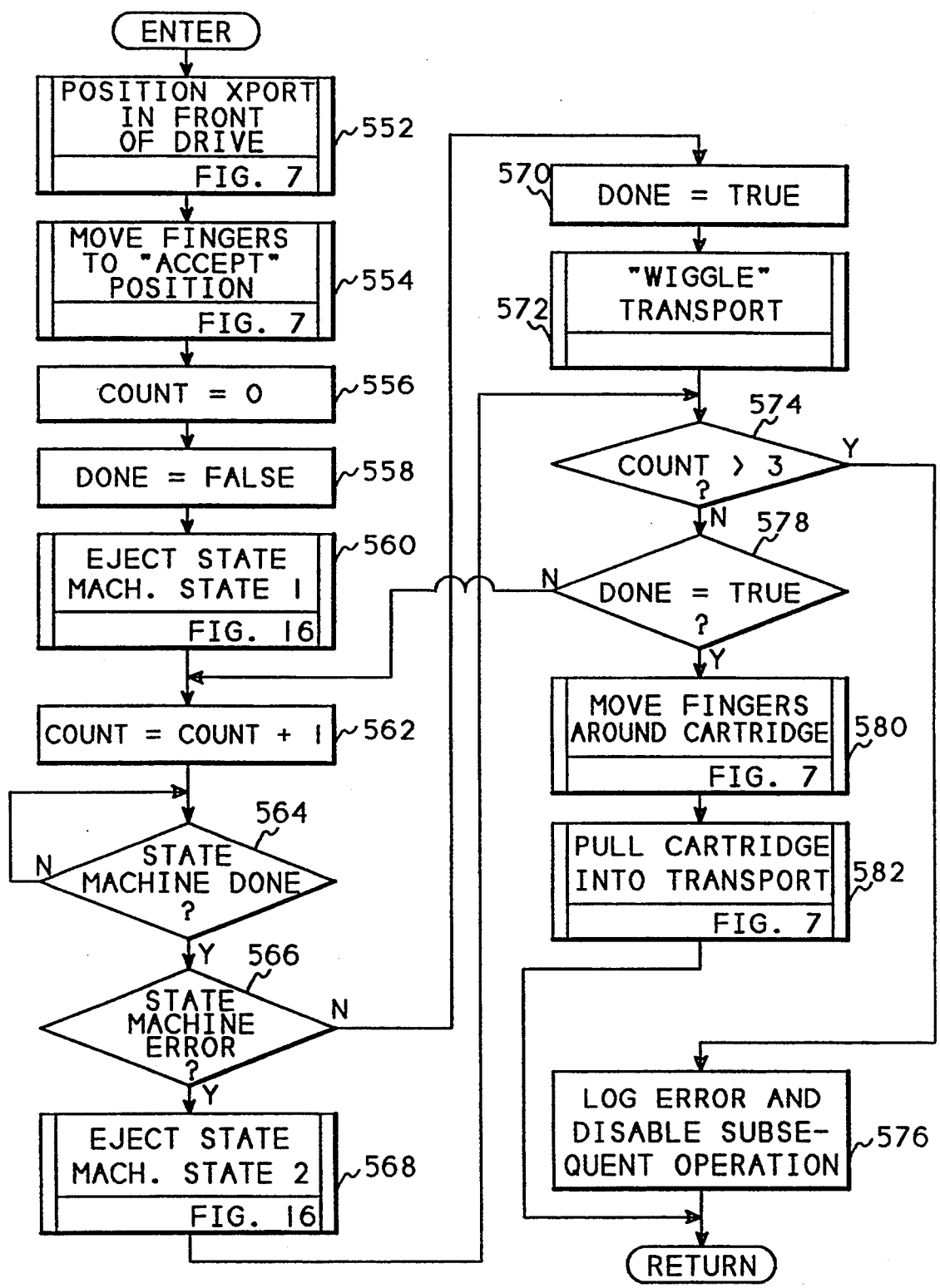
FIG. 15 is a flowchart of the operation of removing a cartridge from the optical drive.

FIG. 15 is a flowchart of the process of unloading a cartridge from the optical drive. Referring now to FIG.

15, after entry, block 552 positions the transport in front of the drive, aligned vertically to the center of the drive. Block 554 then calls FIG. 7 to move the transport to a point where the fingers are in a position to accept the cartridge as it is ejected from the drive. As described earlier, the transport has two fingers which are used to pull the media into the transport. These fingers fit into notches on either side of the cartridge, and have springs that allow them to open and then close on the cartridge as the cartridge is pushed into the transport. The cartridge must be pushed hard enough against the fingers so that the fingers will be open and the cartridge will move far enough for the fingers to close on the cartridge. Block 556 then sets a count value to zero, and block 558 sets a done flag to false. Block 560 then calls FIG. 16 to start the eject state machine in state one. The eject state machine (described below with respect to FIG. 16) monitors the interface 25 (FIG. 12) to determine what operation is being performed by the optical drive. After starting the state machine, block 560 transfers to block 562 to increment the count value by one. Block 564 then waits until the eject state machine indicates that it is complete. After the state machine indicates complete, block 566 determines whether the state machine had a time-out error, and if a time-out error occurred block 566 transfers to block 568 to restart the eject state machine in state two. If no error occurred block 566 transfers to block 570 to set the done flag to true and then block 572 calls FIG. 7 to perform a "wiggle" operation on the transport. This "wiggle" operation accounts for the fact that a perfect alignment does not always occur between the transport and the eject slot of the drive. If the misalignment is large, the cartridge will not be ejected far enough into the transport and the fingers will not be able to grab the cartridge. Therefore, this step moves the transport up one millimeter, then down two millimeters, and then back up one millimeter. This motion allows the cartridge to "wiggle" into the transport. Control then transfers to block 574 which checks to see if the count value is greater than three. This count is used to determine the number of times the eject has been attempted. If the eject has been attempted more than three times, control transfers to block 576 to log an error and disable subsequent operations, since it is presumed that the drive is unable to eject the cartridge. If the count is not greater than three, block 574 transfers to block 578 which checks the done flag. If the done flag is not true, control transfers back to block 562 to try another iteration of the eject. If the done flag is true, block 578 transfers to block 580 which calls FIG. 7 to move the fingers around the media. Normally the ejected cartridge should have forced the fingers open and caused the cartridge into the transport far enough to cause the fingers to close in on the notches on the cartridge. However, if the ejected cartridge did not have enough energy to force the fingers open, this step will move the fingers around the cartridge by quickly pushing the fingers into the cartridge causing them to open and then close on the notches.

Control then transfers to step 582 which pulls the media into the transport before returning to the caller.

Figure 16:
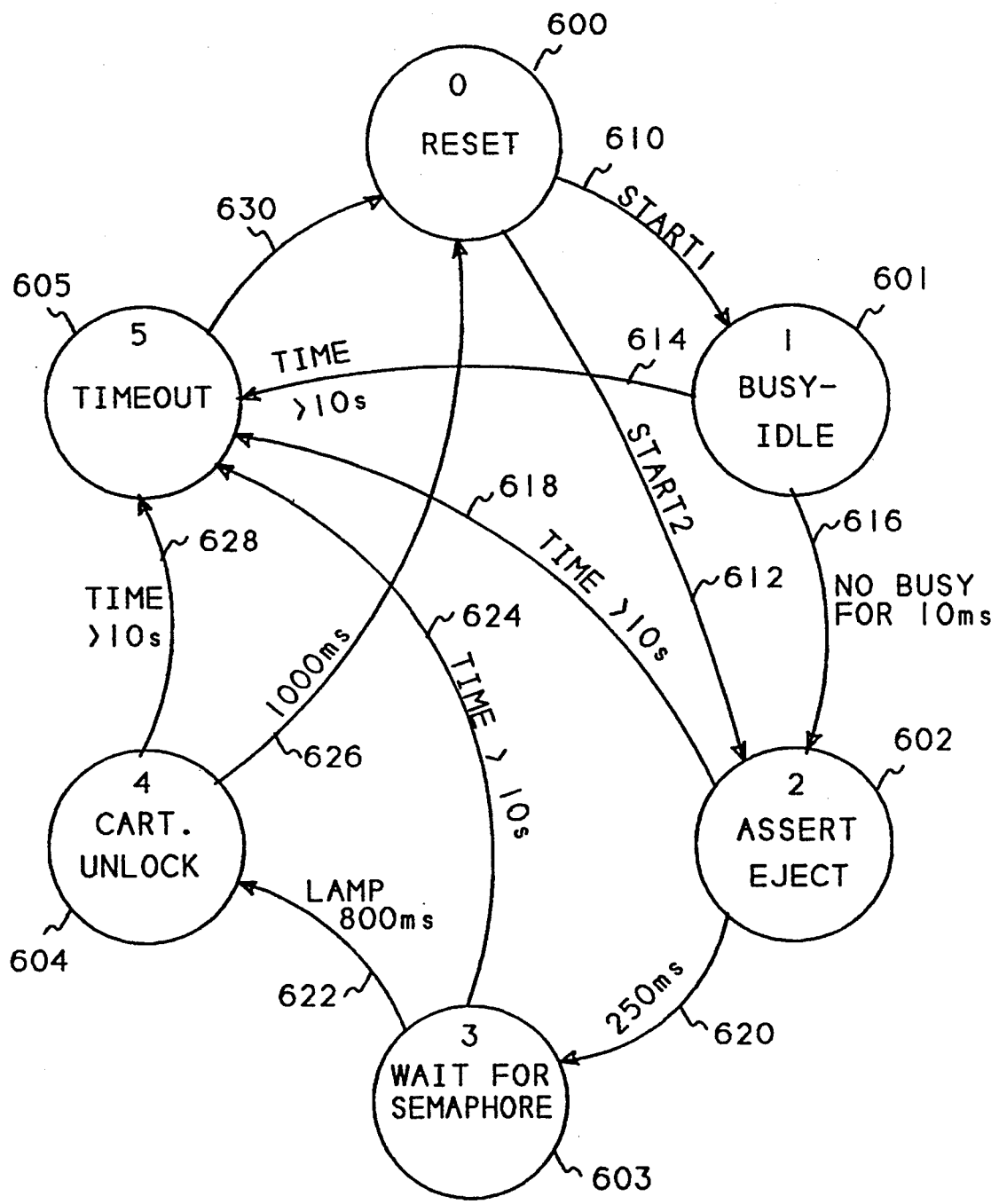
FIG. 16 is a state machine diagram of a state machine that monitors the lamp signal to determine the operation being performed by the optical drive.

FIG. 16 is a diagram of a state machine used to determine whether an eject has occurred in the optical drive. Referring now to FIG. 16, the eject state machine normally stays in state zero 600 which is the reset state. The state machine may be changed to state one by asserting the START1 variable 610 or by asserting the START2 variable 612. Which of these variables will be asserted is a function of the flowchart of FIG. 15 described above. START1 is normally asserted to transfer the state machine from the reset state 600 to the busy/idle state 601 when an eject operation is first initiated. On retrys of an eject operation, START2 will be asserted by block 568 of FIG. 15 to transfer the state machine directly to the assert eject state two 602. The state machine will stay in the busy/idle state 601 and wait for 10 milliseconds to determine if busy has been asserted. If no busy has been asserted for 10 milliseconds, the busy/idle state 601 will switch to the assert eject state 602. The busy/idle state 601 and all other states of the state machine except for reset state 600, check a time signal to determine the total amount of time the state machine has been out of state zero. If the total time the state machine has been out of state zero exceeds 10 seconds, any of the states that detect this condition will transfer immediately to time-out state five 605. The assert eject state 602 sets the eject request signal 404 (FIG. 12) to start the optical drive into an eject sequence. After 250 milliseconds, the assert eject state 602 switches to the wait-for-eject semaphore state 603. This state monitors the lamp signal 406 (FIG. 12) and waits for the lamp signal 406 to be continuously asserted for at least 800 milliseconds. After the lamp signal 406 has been asserted for a continuous 800 milliseconds, the wait-for-eject semaphore state 603 transfers to the cartridge unlock and eject state 604. This state simply waits one second for the drive to complete the eject operation and then transfers to the reset state zero 600.

As mentioned earlier, all the states check a time counter to determine if the total time accumulated since the eject state machine left state zero has exceeded 10 seconds. If this total time does exceed 10 seconds, the state detecting this condition transfers to state five time-out 605 which posts an error before returning to the reset state zero 600.

Having thus described a presently preferred embodiment of the present invention, it will now be appreciated that the objects of the invention have been fully achieved, and it will be understood by those skilled in the art that many changes in construction and circuitry and widely differing embodiments and applications of the invention will suggest themselves without departing from the spirit and scope of the present invention. The disclosures and the description herein are intended to be illustrative and are not in any sense limiting of the invention, more preferably defined in scope by the following claims.

| Operation ID | $V_p$ mm/s | Accel mm/s2 | Y_force lbs | Z_force lbs | DIST Eu's | Gain See Below |
| --- | --- | --- | --- | --- | --- | --- |
| TRANSLATE SATURATE | 50 | 1000 | 18 | 5 | 600 | trans |
| CART REMOVAL | 1000 | 2000 | 18 | 9 | 425 | plunge |
| CART INSERT | 1000 | 2000 | 18 | 9 | 800 | plunge |
| ACCEPT TEST | 750 | 3000 | 14 | 14 | 1500 | plunge |
| DRIVE INSERT | 120 | 5720 | 18 | 12 | 57 | plunge |
| FLIP SATURATE | 100 | 250 | 20 | 10 | 500 | flip |
| TEST FOR CART | 1000 | 2000 | 18 | 9 | 1750 | plunge |

-continued

| Operation ID | $V_p$ mm/s | Accel mm/s2 | Y_force lbs | Z_force lbs | DIST Eu's | Gain See Below |
|---|---|---|---|---|---|---|
| IN CELL TEST FOR CART IN DRIVE AND TRANSPORT | 1000 | 2000 | 18 | 9 | 2480 | plunge |
| ROTATE IN JAM | 350 | 1000 | 18 | 13 | 4536 | plunge |
| ROTATE IN/OUT COMPLETED | 350 | 1000 | 18 | 9 | 567 | plunge |

$V_p$ is peak velocity allowable in millimeters per second.
Accel is the acceleration to use when ramping velocity up/down, in millimeters per second per second.
Y_force is the saturation threshold for the Y control system im pounds.
Z_force is the saturation threshold for the Y control system im pounds.
DIST is the maximum distance to travel during the saturate in encoder units. Encoder units are counts of feedback from the shaft encoder.
Gains are the control loop gains when performing the saturation, as described below.

TABLE 1

Control System Parameters
The gain numbers used for compensation in the control loops are:

Y_kp is the value for $K_p$ in the Y control loop compensator.
Y_kv is the value for $K_v$ in the Y control loop compensator.
Z_kp is the value for $K_p$ in the Z control loop compensator.
Z_kv is the value for $K_v$ in the Z control loop compensator.
Units for $K_p$ are (PWM counter)/(Encoder Unit of Position).
Units for $K_v$ are Milliseconds.
All values are times 256, for scaling purposes.

Standby
Y_kp = 110
Y_kv = 2048
Z_kp = 110
Z_kv = 1664

Translate
Y_kp = 110
Y_kv = 2048
Z_kp = 55
Z_kv = 1792

Plunge
Y_kp = 220
Y_kv = 1357
Z_kp = 110
Z_kv = 1664

Flip
Y_kp = 220
Y_kv = 1357
Z_kp = 55
Z_kv = 2560

Vertical movement
Y_kp = 110
Y_kv = 2048
Z_kp = 110
Z_kv = 2048

What is claimed is:

1. An interface circuit connected between an optical disk handling system and an optical drive comprising:

an ejection circuit contained within said optical disk handling system for switching an ejection request signal within said interface circuit between "on" and "off" states;

at least one lamp signal within said interface circuit for indicating "on" and "off" states;

switching means contained within said optical drive, and connected to said at least one lamp signal, for switching said at least one lamp signal to different "on" state pulse widths dependent upon which of a plurality of operations is being performed within said optical drive; and a sensor contained within said optical disk handling system, and connected to said at least one lamp signal within said interface circuit, for detecting said different "on" state pulse widths of said at least one lamp signal to determine which of said plurality of operations is being performed by said optical drive.

2. The interface as defined in claim 1 wherein said sensor further comprises:

means for sensing an "on" state pulse width of said at least one lamp signal of between 0.2 and 1 second; and means for indicating a busy condition upon sensing said "on" state pulse width.

3. The interface as defined in claim 1 wherein said switching means within said optical drive switches said at least one lamp signal to said "on" state upon being powered up and retains said at least one lamp signal in said "on" state until said optical drive successfully completes a self-test operation, whereupon said switching means within said optical drive switches said at least one lamp signal to said "off" state.

4. The interface circuit as defined in claim 3 wherein said optical disk handling system requests said optical drive to perform an eject operation by switching said ejection request signal to said "on" state, and wherein upon detecting said switching of said ejection request signal in said "on" state while performing said self-test, said optical drive completes said self-test, switches said at least one lamp signal to said "off" state, waits a predetermined amount of time, switches said at least one lamp signal to said "on" state to start said eject operation, and retains said at least one lamp signal in said "on" state for at least 1 second whereupon said optical drive switches said at least one lamp signal to said "off" state.

5. The interface circuit as defined in claim 1 wherein said optical disk handling system requests said optical drive to perform an eject operation by switching said ejection request signal to said "on" state, and wherein upon detecting said ejection request signal in said "on" state, said optical drive switches said at least one lamp signal means to said "on" state upon starting said eject operation and said optical drive retains said at least one lamp signal in said "on" state for at least 1 second, whereupon said optical drive switches said at least one lamp signal to said "off" state.

6. The interface circuit as defined in claim 5 wherein said optical drive completes any pending operations before switching said at least one lamp signal to said "on" state upon starting said eject operation.

* * * * *